United States Patent
Tanaka

(10) Patent No.: US 7,231,095 B2
(45) Date of Patent: Jun. 12, 2007

(54) SPREAD SPECTRUM SIGNAL DEMODULATION METHOD AND APPARATUS

(75) Inventor: Katsuyuki Tanaka, Kanagawa (JP)

(73) Assignee: Sony Corporation (JP)

( * ) Notice: Subject to any disclaimer, the term of this patent is extended or adjusted under 35 U.S.C. 154(b) by 724 days.

(21) Appl. No.: 10/362,070

(22) PCT Filed: Jun. 24, 2002

(86) PCT No.: PCT/JP02/06291

§ 371 (c)(1),
(2), (4) Date: Feb. 19, 2003

(87) PCT Pub. No.: WO03/001698

PCT Pub. Date: Jan. 3, 2003

(65) Prior Publication Data

US 2003/0161543 A1 Aug. 28, 2003

(30) Foreign Application Priority Data

Jun. 25, 2001 (JP) ............................ 2001-190658

(51) Int. Cl.
G06K 9/36 (2006.01)
G06K 9/46 (2006.01)

(52) U.S. Cl. .................. 382/250; 382/233; 382/280; 375/324; 375/149

(58) Field of Classification Search ........... 382/280, 382/250, 276, 232, 233; 375/324, 149, 152, 375/150, 326; 708/403, 404, 405
See application file for complete search history.

(56) References Cited

U.S. PATENT DOCUMENTS 5,974,101 A * 10/1999 Nago ..................... 375/350
6,288,631 B1 * 9/2001 Shinozaki et al. .......... 375/260
6,792,035 B2 * 9/2004 Kontola ..................... 375/148
2003/0231704 A1 * 12/2003 Tanaka et al. .............. 375/150
2006/0055597 A1 * 3/2006 Kato et al. ............. 342/357.12

FOREIGN PATENT DOCUMENTS

JP 10-070520 3/1998
JP 2000-040982 2/2000
WO WO 02/13476 A1 2/2002

* cited by examiner

Primary Examiner—Matthew C. Bella
Assistant Examiner—Ali Bayat
(74) Attorney, Agent, or Firm—Lerner, David, Littenberg, Krumholz & Mentlik, LLP

(57) ABSTRACT

The present invention relates to a spread spectrum signal demodulating method whereby spread-code synchronous acquisition and carrier synchronous acquisition are performed using FFT at high speed, wherein a received signal, of which the carrier wave is modulated with a signal obtained by spectrum-spreading data with a spread code, is subjected to the FFT and the result of the FFT is stored in a first memory. The FFT result of the received signal stored in the first memory and the result of FFT of the spread code, the result being stored in a second memory, are read out and the results are multiplied to detect the correlation between the received signal and the spread code. During the detection of the correlation, a readout address of either the FFT result of the received signal or the FFT result of the spread code is shifted by an amount corresponding to a carrier frequency of the received signal and the result is read from the first or second memory. The result of the multiplication is subjected to inverse FFT, thus detecting the correlation point between the received signal and the spread code.

2 Claims, 17 Drawing Sheets

FIG. 23

[EXPRESSION (1)]

$$F[r(n) * c(n)] \iff F(k) = R(k)\,C(k)$$

[EXPRESSION (2)]

$$F(k) = R(k)\overline{C(k)} \quad \text{(WHERE, } \overline{\phantom{x}} \text{ REPRESENTS COMPLEX CONJUGATE)}$$

[EXPRESSION (3)]

$$r(n) = A \cdot d(n) \cdot c(n) \cdot \cos 2\pi n \cdot f_0 + n(n)$$

[EXPRESSION (4)]

$$F[r(n) \cdot \exp(j\,2\pi n\, f_0 + \phi_0)] = \exp(j\,\phi_0) R(k - k_0)$$

[EXPRESSION (5)]

$$F'(k) = R(k - k_0)\overline{C(k)}$$

[EXPRESSION (6)]

$$|f'(n)| = \sqrt{f_R'(n)^2 + f_I'(n)^2}$$

[EXPRESSION (7)]

$$\phi_0 = \tan^{-1}(f_I'(n) / f_R'(n))$$

[EXPRESSION (8)]

$$F'(k) = R(kM - k')\overline{C(k)} = R(kM - k_0)\overline{C(k)}$$

SPREAD SPECTRUM SIGNAL DEMODULATION METHOD AND APPARATUS

TECHNICAL FIELD

The present invention relates to a method and apparatus for demodulating a spread spectrum signal such as a GPS (Global Positioning System) satellite signal.

BACKGROUND ART

In a GPS system for measuring the location of a mobile unit using satellites (GPS satellites), a GPS receiver has a basic function of receiving signals from four or more GPS satellites, calculating the location of the receiver on the basis of the received signals, and informing the user of the location.

The GPS receiver demodulates the signals from the GPS satellites to capture orbital data of the GPS satellites and then derives the three-dimensional location of the present receiver from the orbits of the GPS satellites, time information, and delay time of the received signals by means of simultaneous equations. The reason why the four GPS satellites from which signals are obtained are needed is that there is an error between time in the GPS receiver and time in each satellite and the signals are used in order to eliminate the effect of the error.

A civilian GPS receiver receives spread spectrum signal waves called C/A (Clear and Acquisition) codes on the L1 band from GPS satellites (Navstar) to perform the positioning operation.

The C/A code is a signal, of which carrier wave (hereinbelow, referred to as a carrier) having a frequency of 1575.42 MHz is subjected to BPSK (Binary Phase Shift Keying) modulation with a signal obtained by spreading 50-bps data with a PN (Pseudorandom Noise) sequence code such as a Gold code having a transmission signal rate (chip rate) of 1.023 MHz and a code length of 1023. In this case, since the code length is 1023, as shown in (A) of FIG. 21, the C/A code serving as the PN sequence code repeats on condition that 1023 chips correspond to one period (therefore, one period=one millisecond).

The GPS satellites use different PN sequence codes as the C/A codes. The GPS receiver can previously distinguish the kinds of PN sequence codes used by the respective GPS satellites from each other. The GPS receiver also determines that a signal transmitted from each GPS satellite can be received on a predetermined location at predetermined time using a navigation message, which will be described later. Accordingly, for example, in the three-dimensional positioning, the GPS receiver receives radio waves from four or more GPS satellites which can be acquired on that location at that time and then performs spectrum despreading and the positioning operation to obtain its own location.

As shown in (B) of FIG. 21, one bit of satellite signal data is transmitted every 20 periods of the PN sequence code, namely, 20 milliseconds. That is, the data transmission rate is 50 bps. A code pattern of 1023 chips corresponding to one period of the PN sequence in a case where a bit indicates "1" is opposite to that in a case where a bit indicates "0".

As shown in (C) of FIG. 21, in the GPS, one word is composed of 30 bits (600 milliseconds). As shown in (D) of FIG. 21, one subframe (six seconds) is composed of 10 words. As shown in (E) of FIG. 21, preamble is disposed at the head word of one subframe, the preamble serving as a bit pattern which is always fixed even when data is updated. Data is transmitted subsequent to the preamble.

Further, one frame (30 seconds) is composed of five subframes. The navigation message is transmitted every one frame serving as a data unit. Information called ephemeris information peculiar to satellites is composed of three former subframes of the one-frame data. This information includes parameters to obtain the orbit of the satellite and transmission time of a signal from the satellite.

Each GSP satellite has an atomic clock and uses common time information. The transmission time of a signal from the GSP satellite is measured in seconds of the atomic clock. The PN sequence code of the GPS satellite is generated on condition that the code is synchronized with the atomic clock.

Orbital information of the ephemeris information is updated every several hours. The same orbital information is used until the information is updated. However, when the orbital information of the ephemeris information is stored in a memory of the GPS receiver, the same orbital information can be used accurately for several hours. The transmission time of a signal from each GSP satellite is updated every second.

The navigation message composed of the latter two subframes of the one-frame data denotes information called almanac information which is transmitted from all the satellites in common. The almanac information needs 25 frames to obtain all information. The almanac information comprises approximate positional information of the GPS satellites and information indicating which GPS satellite can be used. The almanac information is updated every several months. The same almanac information is used until the information is updated. However, when the almanac information is stored in a memory of the GPS receiver, the same information can be used accurately for several months.

In order to receive the GPS satellite signal and then obtain the above-mentioned data, the carrier is first removed. After that, using the same PN sequence code (hereinbelow, the PN sequence code will be referred to as a PN code) as that of the C/A code used in the GPS satellite to be received, the same PN code being prepared in the GPS receiver, the phase of the signal from the GPS satellite is synchronized with the phase of the C/A code to capture the signal from the GPS satellite. Then, the captured signal is spectrum-despread. After the phase synchronization with the C/A code is acquired and the despreading is performed, bits are detected. Thus, the navigation message including time information and the like can be obtained from the signal from the GPS satellite.

The signal from the GPS satellite is acquired by searching the phase synchronization with the C/A code. In searching the phase synchronization, the correlation between the PN code of the GPS receiver and the PN code of a received signal from the GPS satellite is detected. For example, when a correlation value of the correlation detection result is larger than a predetermined value, it is determined that both of the codes are synchronized with each other. If it is determined that they are not synchronized with each other, the phase of the PN code of the GPS receiver is controlled using any synchronizing method so as to be synchronized with the PN code of the received signal.

As mentioned above, the GPS satellite signal is a signal, of which carrier is subjected to BPSK modulation with a signal obtained by spreading data with a spread code. Accordingly, in order to allow the GPS receiver to receive the GPS satellite signal, it is necessary to acquire only spread-code synchronization but also carrier synchronization and data synchronization with the GPS satellite signal.

However, the spread-code synchronization and the carrier synchronization cannot be separately performed.

In the GPS receiver, generally, the carrier frequency of the received signal is converted into an intermediate frequency of several MHz and the above-mentioned synchronization detecting process is performed using the intermediate frequency. The carrier in the intermediate-frequency signal includes a frequency error caused by Doppler shift corresponding to the moving speed of the GPS satellite and a frequency error of a local oscillator, the error being caused in the GPS receiver when the received signal is converted into an intermediate-frequency signal.

Therefore, the carrier frequency of the intermediate-frequency signal is unknown due to these frequency errors. It is necessary to search the carrier frequency. Since a synchronization point (synchronized phase) in one period of the spread code depends on the positional relationship between the GPS receiver and the GPS satellite, the synchronization point is also unknown. As mentioned above, any synchronizing method is needed.

In conventional GPS receivers, frequency search with respect to carriers and a synchronizing method using a sliding correlator+DLL (Delay Locked Loop)+Costas loop are used. This method will now be described hereinbelow.

Serving as a clock to drive a PN code generator in a GPS receiver, a clock having a frequency obtained by dividing the frequency of a reference frequency oscillator prepared in the GPS receiver is generally used. A high-precision quartz oscillator is used serving as the reference frequency oscillator. On the basis of an output of the reference frequency oscillator, a local oscillation signal used to convert a received signal from a GPS satellite into an intermediate-frequency signal is generated.

FIG. 22 is a diagram explaining the frequency search. That is, when the frequency of a clock signal to drive the PN code generator of the GPS receiver is set to a frequency f1, phase synchronization search with respect to the PN code is performed. In other words, the phase of the PN code is sequentially shifted chip by chip. The correlation between the GPS received signal and the PN code at each chip phase is detected to detect the peak correlation value. Thus, the phase at which synchronization can be acquired is detected.

In the case where the frequency of the clock signal is set to f1, if there is no phase for synchronization in searching all the phases of 1023 chips, for example, a frequency dividing rate for the reference frequency oscillator is varied to change the frequency of the driving clock signal to a frequency f2. Then, phases of 1023 chips are similarly searched. As shown in FIG. 22, the above operation is repeated while the frequency of the driving clock signal is being changed stepwise. The above-mentioned operation is the frequency search.

When the frequency of the driving clock signal at which the synchronization can be realized is detected by the frequency search, the final phase synchronization between the PN codes is performed at the clock frequency. Thus, even when there is oscillation frequency drift in the quartz frequency oscillator, satellite signals can be captured.

However, in principle, the above-mentioned conventional method serving as the synchronizing method is not suitable for high-speed synchronization. In actual receivers, in order to compensate the method, it is necessary to realize multichannel formation and search for a synchronization point in parallel. As mentioned above, the spread-code synchronization and the carrier synchronization require long time, resulting in slow response of the GPS receiver. Disadvantageously, it is inconvenient in actual use.

For the phase synchronization for the spread codes, the improvement of the capability of hardware represented by DSP (Digital Signal Processor) realizes a method for high-speed code synchronization using a digital matched filter utilizing fast Fourier transform (hereinbelow, referred to as FFT (Fast Fourier Transform)) process without using the above-mentioned method using the sliding correlation.

However, the use of the digital matched filter needs to synchronize with the carrier of the received signal to cancel carrier components. Hitherto, in order to cancel the carrier components, information regarding a carrier frequency is derived from others through, for example, a radio network. On the basis of the information, the oscillation frequency of a variable frequency oscillator is controlled. Then, in a time domain prior to the FFT, the received signal is multiplied by the oscillation output of the variable frequency oscillator, thus canceling the carrier components.

Accordingly, in addition to a multiplier for converting a signal into an intermediate-frequency signal, another multiplier is needed. Disadvantageously, the construction for synchronization with the received signal is complicated.

In consideration of the above disadvantages, it is an object of the present invention to provide a method whereby spread-code acquisition and carrier acquisition with a spread spectrum signal such as a GPS satellite signal can be performed at high speed using FFT with a relatively simple construction, and an apparatus utilizing the method.

DISCLOSURE OF INVENTION

In order to solve the above problems, according to the present invention (1), there is provided a spread spectrum signal demodulating method including the steps of:

performing FFT to a received signal, of which carrier wave is modulated with a signal obtained by spectrum-spreading data with a spread code, and then storing the result of the FFT in a first memory;

reading the FFT result of the received signal stored in the first memory and the result of FFT of a spread code, the result being stored in a second memory, and multiplying them to detect the correlation between the received signal and the spread code;

shifting a readout address of either the FFT result of the received signal or the FFT result of the spread code by an amount corresponding to a carrier frequency of the received signal, and then reading the fast Fourier transform result from the first memory or the second memory; and performing inverse FFT to the result of the multiplication to detect the correlation point between the received signal and the spread code.

According to the present invention (2), in the spread spectrum signal demodulating method according to the present invention (1), the carrier frequency of the received signal is known in a receiver, the readout address is shifted by an amount corresponding to the known carrier frequency, and the FFT result is then read from the first memory or the second memory.

According to the present invention (3), there is provided a spread spectrum signal demodulating method including the steps of:

performing FFT to a received signal and then storing the result of the FFT in a first memory;

multiplying the FFT result of the received signal read from the first memory by the result of FFT of a spread code, the result being read from a second memory;

performing inverse FFT to the result of the multiplication to obtain a correlation detection output between the received signal and the spread code; and searching the peak of the correlation between the received signal and the spread code on the basis of the correlation detection output and determining the peak of the correlation, while shift-controlling a readout address of either the FFT result of the received signal or the FFT result of the spread code in the first memory or the second memory on the basis of the result of the search, to detect the correlation point between the received signal and the spread code.

According to the present invention (4), in the spread spectrum signal demodulating method according to the present invention (1) or (3), the FFT of the received signal, of which carrier wave is modulated with a signal obtained by spectrum-spreading data with a spread code, and the FFT of the spread code are performed every M periods (M is an integer of two or more) of the spread code.

According to the present invention (5), in the spread spectrum signal demodulating method according to the present invention (4), in the FFT of the received signal, the whole frequency components of the received signal are not simultaneously calculated, the FFT of the received signal is divided into L times (L is an integer of two or more), and the FFT of the received signal is performed every 1/L.

As will be described later, for example, when the result of the multiplication of a received signal and a carrier signal is subjected to FFT, the FFT result thereof is equivalent to a FFT result of the received signal obtained by shifting a discrete frequency by an amount corresponding to a carrier frequency.

Using the characteristics of the FFT, in the present invention (1), either the FFT result of the received signal or the FFT result of the spread code is shifted by an amount corresponding to the carrier frequency of the received signal and is then read from the memory. The FFT result shifted and read out in this manner is equivalent to the FFT result from which the carrier components are removed.

Accordingly, when the FFT result of the received signal read from the memory is multiplied by the FFT result of the spread code, and the result of the multiplication is subjected to inverse FFT to obtain the correlation therebetween, the peak value of the correlation can be obtained without frequency search of the carrier. Thus, the spread-code synchronization can be detected. In other words, according to the present invention (1), the spread-code synchronization and the carrier synchronization can be acquired without using a multiplier for carrier elimination.

When a carrier frequency is unknown in the same case as the present invention (2), the present invention (1) is very effective. For example, when the amount of Doppler shift is exactly estimated and the oscillation frequency and time information in the GPS receiver are correct, the carrier frequency is known. The readout address in the memory is shifted using the known carrier frequency, so that the carrier synchronization can be acquired.

In the same way as the present invention (1), according to the present invention (3), basically, the readout address of the FFT result is controlled to acquire the carrier synchronization. The present invention (3) is effective when the carrier frequency is unknown.

In other words, according to the present invention (3), while the amount of shift of the readout address of either the FFT result of the received signal or the FFT result of the spread code is being changed on the basis of the correlation detection output of the result of the inverse FFT, the correlation point between the received signal and the spread code is searched. The peak value of the correlation detection output is detected, thus detecting the correlation point. The carrier frequency can be detected at the shift phase at which the correlation detection output has a peak.

According to the present invention (4), the FFT of the received signal is not performed every one period of the spread code. The FFT is performed every plural periods of the spread code. When the FFT is performed every plural periods of the spread code as mentioned above, the FFT results each corresponding to one period are accumulated for plural periods and noise components statistically distributed at random are reduced. Thus, the C/N of the correlation detection result is improved.

When the FFT is performed every plural periods of the spread code in the same case as the present invention (4), a memory having a large capacity is needed. According to the present invention (5), in consideration of the flow of the FFT calculation, the FFT calculation is divided into L times (L is an integer of two or more) so that the same calculation structure components are set to a unit, and the FFT of the received signal is performed every 1/L. Consequently, when a memory has a capacity necessary for the FFT calculation of each time, it is sufficient.

BRIEF DESCRIPTION OF THE DRAWINGS

FIG. 23 is a diagram used in the explanation regarding the embodiments of the present invention.

BEST MODE FOR CARRYING OUT THE INVENTION

Embodiments of a spread spectrum signal demodulating method according to the present invention will now be described hereinbelow with respect to a case where the method is applied to a GPS receiver as mentioned above with reference to the drawings.

[First Embodiment]

Figure 1:
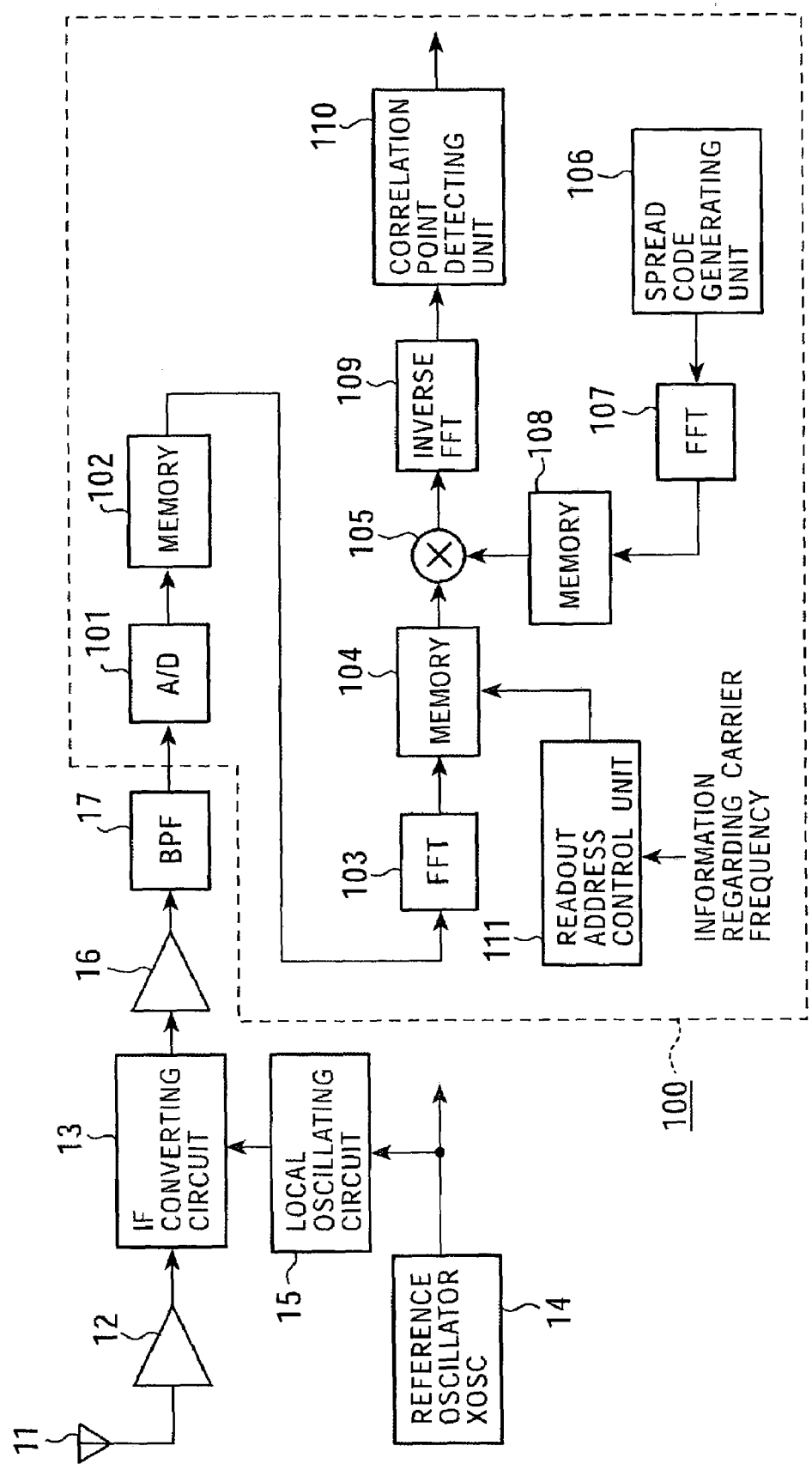
FIG. 1 is a block diagram showing the configuration of a GPS receiver of a spread spectrum signal demodulating apparatus according to a first embodiment of the present invention.

FIG. 1 is a block diagram showing an example of the configuration of a GPS receiver in a spread spectrum signal demodulating apparatus according to a first embodiment. As shown in FIG. 1, a received signal (spread spectrum signal) transmitted from a GPS satellite is received by an antenna 11. The received signal is supplied to an intermediate-frequency converting circuit 13 through a high-frequency amplifying circuit 12. An output of a reference oscillator 14 comprising a quartz oscillator is supplied to a local oscillating circuit 15, thus obtaining a local oscillation output in which the ratio of the frequency thereof to an output frequency of the reference oscillator is fixed.

The local oscillation output is supplied to the intermediate-frequency converting circuit 13 to low-frequency convert the satellite signal into an intermediate-frequency signal having an intermediate frequency of 1.023 MHz. The intermediate-frequency signal is amplified through an amplifying circuit 16 and is then subjected to band limitation by a band-pass filter 17. After that, the resultant signal is supplied to a DSP (Digital Signal Processor) 100.

In FIG. 1, the block diagram corresponding to a portion surrounded by a broken line shows functions performed in the DSP 100, each function serving as hardware. It is a matter of course that each block can also be constructed serving as hardware using a discrete circuit. The configuration of the DSP 100 in FIG. 1 shows the configuration of a digital matched filter.

The signal supplied to the DSP 100 is first converted into a digital signal through an A/D converting unit 101 and is then stored in a buffer memory 102. The signal stored in the buffer memory 102 is read out every period (1023 chips) of the spread code. The readout signal is subjected to a FFT process by a FFT processing unit 103. The FFT result is stored in a memory 104. The FFT result of the received signal read from the memory 104 is supplied to a multiplying unit 105.

On the other hand, a spread code of the same sequence as that of a spread code used in the received signal transmitted from a satellite, the received signal being processed in the DSP 100 at that time, is generated from a spread code generating unit 106. The spread code corresponding to one period (1023 chips) generated from the spread code generating unit 106 is supplied to a FFT processing unit 107 and is then subjected to the FFT process. Further, its complex conjugate is calculated and the processing result is supplied as the FFT result of the spread code to a memory 108. The FFT results are read out in increasing order of frequency and are then supplied to the multiplying unit 105.

The multiplying unit 105 multiplies the FFT result of the received signal from the memory 104 by the FFT result of the spread code from the memory 108 to calculate the degree of correlation between the received signal and the spread code in a frequency domain. The result of the multiplication is supplied to an inverse FFT processing unit 109. Thus, the frequency-domain signal is converted back into a time-domain signal.

The inverse FFT result obtained by the inverse FFT processing unit 109 represents a time-domain correlation detection signal between the received signal and the spread code. The correlation detection signal is supplied to a correlation point detecting unit 110. In the correlation point detecting unit 110, whether the received signal is synchronized with the spread code is detected. When it is detected that they are synchronized with each other, the phase of the peak value is detected serving as a correlation point.

Figure 2:
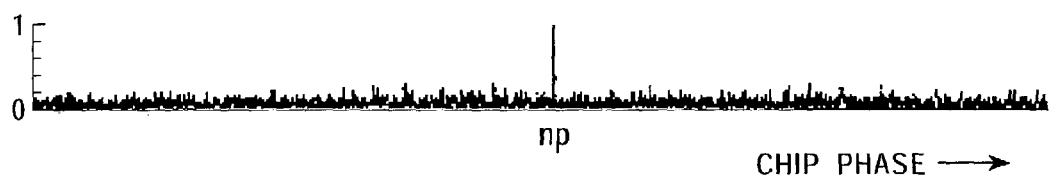
FIG. 2 is diagram showing an example of spectrum of a correlation detection output.

The correlation detection signal indicates a correlation value at each chip phase of one period of the spread code. When the spread code in the received signal is synchronized with the spread code from the spread code generating unit 106, a correlation waveform in which the correlation value at the phase of one of 1023 chips represents a peak value exceeding a predetermined threshold value is obtained as shown in FIG. 2. The chip phase having the peak value serves as the phase of the correlation point.

On the other hand, when the spread code in the received signal is not synchronized with the spread code from the spread code generating unit 106, the correlation waveform having the peak value as shown in FIG. 2 is not obtained. There is no peak exceeding the predetermined threshold value at any chip phase.

For example, on the basis of a fact indicating whether the peak value exceeding the predetermined value exists in the correlation detection signal supplied to the correlation point detecting unit 110, the correlation point detecting unit 110 detects whether the received signal is synchronized with the spread code. When detecting that they are synchronized with each other, the correlation point detecting unit 110 detects the phase of the peak value serving as the correlation point.

In the above description, the carrier of the received signal is not considered. Actually, a received signal r(n) includes a carrier as shown in Expression (3) of FIG. 23. In Expression (3), reference symbol A represents an amplitude; d(n) data; fo a carrier angular frequency; and n(n) a noise.

Reference symbol fs represents a sampling frequency in the A/D converting unit 101 and N denotes the number of sampling times (therefore, $0 \leq n \leq N$, $0 \leq k < N$). Then, if $0 \leq k \leq N/2$, the relationship between a discrete frequency k obtained by discrete Fourier transform and a real frequency f is expressed by $f = k \cdot fs/N$. When $N/2 < k < N$, the relationship therebetween is expressed by $f=(k-N)\cdot fs/N$ ($f<0$). Due to the characteristics of the discrete Fourier transform, when $k<0$ and $k \geqq N$, each of $R(k)$ and $C(k)$ represents periodicity.

In order to obtain the data $d(n)$ from the received signal $r(n)$, it is necessary to remove the carrier components by acquiring synchronization with respect to the spread code $c(n)$ and the carrier $\cos 2\pi n f_0$. In other words, in Expression (2) of FIG. 23, which will be explained later, when only $R(k)$ contains the carrier components, the correlation waveform as shown in FIG. 2 is not obtained.

According to the present embodiment, with the simple construction using only the frequency-domain process utilizing the FFT, the synchronization with respect to the spread code $c(n)$ and the carrier $\cos 2\pi n f_0$ is acquired, so that the carrier components can be removed.

In other words, generally, the FFT results of the received signals from the GPS satellites, the FFT results being obtained from the FFT processing unit 103, are read from the memory 104 in increasing order of frequency in the frequency components of the received signal and are then supplied to the multiplying unit 105. However, according to the present embodiment, a readout address is shifted in accordance with a control by a readout address control unit 111 and the FFT results of the received signal are sequentially read from the memory 104.

Information regarding the carrier frequency of the received signal, which is detected on the basis of a process of correctly estimating the amount of Doppler shift with respect to the GPS satellite from which the received signal is obtained and correctly calibrating the oscillation frequency and time information of the GPS receiver, is supplied to the readout address control unit 111. The carrier-frequency information can be formed in the GPS receiver alone. Generally, the information is obtained from the outside.

The readout address control unit 111 shifts the readout address by an amount corresponding to the carrier frequency on the basis of the obtained carrier-frequency information, sequentially reads the FFT result of the received signal from the memory 104, and then supplies the readout FFT result to the multiplying unit 105.

As mentioned above, the FFT result of the received signal $r(n)$ is shifted by the amount corresponding to the carrier frequency of the received signal and is then read from the memory 104, thus obtaining the FFT result equivalent to the FFT result of the received signal in which the carrier components are removed, as will be described later. The result of the multiplication of the FFT result, in which the carrier components are removed, and the FFT result of one period of the spread code is despread. Thus, the correlation detection output, in which the peak occurs at the correlation point as shown in FIG. 2, can be certainly obtained.

As will be described later, the readout address of the FFT result in the memory 104 is not controlled. The readout address of the FFT result of the spread code in the memory 108 is controlled. Thus, the carrier components of the received signal $r(n)$ are added to the FFT result of the spread code. Multiplication is then performed in the multiplying unit 105. Consequently, the carrier components can also be substantially removed.

The removal of the carrier components due to the carrier synchronization and the spread-code synchronization with the received signal by controlling the readout address in the memory 104 or 108 will now be described in more detail together with the description of the operation of the digital matched filter process in the DSP 100.

In the present embodiment, the DSP executes the process of the digital matched filter. The principle of the process of the digital matched filter is based on such a principle that convolutional Fourier transform in the time domain represents multiplication in the frequency domain as shown in Expression (1) of FIG. 23.

In Expression (1), $r(n)$ denotes the received signal in the time domain; $R(k)$ its discrete Fourier transform; $c(n)$ the spread code from the spread code generating unit; $C(k)$ its discrete Fourier transform; $n$ discrete time; $k$ a discrete frequency; and $F[\ ]$ Fourier transform.

The correlation function between two signals $r(n)$ and $c(n)$ is defined as $f(n)$. The discrete Fourier transform $F(k)$ of $f(n)$ is expressed as shown in Expression (2) of FIG. 23. Therefore, when it is assumed that $r(n)$ denotes the signal from the A/D converting unit 101 in FIG. 1 and $c(n)$ indicates the spread code from the spread code generating unit 106, the correlation function $f(n)$ between $r(n)$ and $c(n)$ can be calculated by the following procedure on the basis of Expression (2) as mentioned above without using the normal definitional expression.

Calculate the discrete Fourier transform $R(k)$ of the received signal $r(n)$.

Calculate the complex conjugate $\overline{C}(k)$ of the discrete Fourier transform $C(k)$ of the spread code $c(n)$.

Calculate $F(k)$ in Expression (2) using $R(k)$ and the complex conjugate $\overline{C}(k)$ of $C(k)$.

Calculate the correlation function $f(n)$ by performing inverse discrete Fourier transform to $F(k)$.

As mentioned above, when the spread code included in the received signal $r(n)$ matches the spread code $c(n)$ from the spread code generating unit 106, the correlation function $f(n)$ calculated in the above procedure has a time waveform having a peak at the correlation point as shown in FIG. 2. As mentioned above, in the present embodiment, as discrete Fourier transform and inverse Fourier transform, high-speed algorithms of the FFT and the inverse FFT are used. Consequently, the correlation can be calculated at remarkably higher speed than that of calculation based on the definition.

Synchronization with respect to the carrier and the spread code contained in the received signal $r(n)$ will now be described.

As mentioned above, the received signal $r(n)$ contains the carrier as shown in Expression (3) of FIG. 23. In order to obtain the data $d(n)$ from the received signal $r(n)$, it is necessary to remove the carrier by acquiring synchronization with respect to the spread code $c(n)$ and the carrier $\cos 2\pi n f_0$. In other words, when only $R(k)$ contains the carrier in Expression (2) of FIG. 23 mentioned above, the correlation waveform as shown in FIG. 2 is not obtained.

Figure 3:
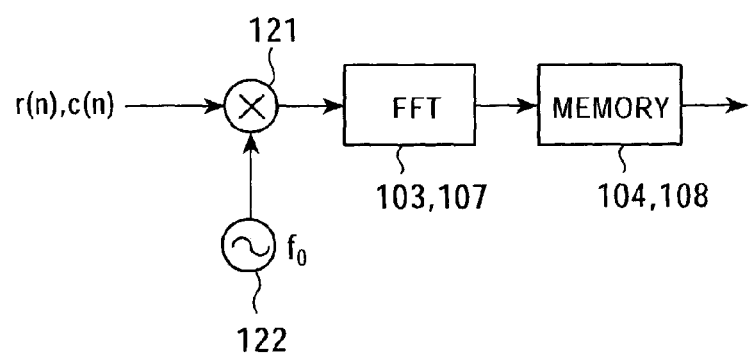
FIG. 3 is a diagram for explaining a general example of a method for acquiring carrier synchronization and spread-code synchronization with a received signal.

When the amount of Doppler shift is correctly estimated and the oscillation frequency and time information in the GPS receiver are correct, the carrier frequency $f_0$ of the received signal $r(n)$ is known. In this case, as shown in FIG. 3, a multiplying unit 121 is disposed in the front of the FFT processing unit 103. The multiplying unit 121 multiplies the received signal $r(n)$ by the carrier of the frequency $f_0$ from a signal generating unit 122 to perform frequency conversion. Thus, the carrier components can be removed from the received signal $r(n)$ prior to the FFT.

In this case, the FFT result of the received signal in which the carrier components are removed is obtained from the memory 104. The FFT result is multiplied by the FFT result of the spread code $c(n)$ in the multiplying unit 105. Accordingly, a time waveform having a peak at the correlation point as shown in FIG. 2 can be certainly obtained serving as an output of the inverse FFT processing unit 109.

As shown in FIG. 3, the carrier components are not removed from the received signal r(n), the multiplying unit 121 is disposed in the front of the FFT processing unit 107 for the spread code c(n), and the spread code c(n) is multiplied by the carrier of the frequency $f_0$ from the signal generating unit 122 in the multiplying unit 121 to perform frequency conversion, resulting adding the carrier components to the spread code. Thus, the similar effect can be obtained.

In other words, in this case, the carrier components contained in the FFT result of the received signal read from the memory 104 are synchronized with the added carrier components contained in the FFT result of the spread code read from the memory 108. Consequently, the correlation detection output in which the peak occurs at the correlation point as shown in FIG. 2 can be obtained by the inverse FFT processing unit 109.

However, according to the method for multiplying the time-domain signal by the carrier frequency signal as shown in FIG. 3 as mentioned above, the multiplying unit for removing the carrier components is especially needed. The configuration becomes complicated. Disadvantageously, the processing speed is lowered by a load corresponding to the multiplying operation.

Serving as the characteristics of the FFT, the above-mentioned frequency multiplication can be expressed as shown in Expression (4) of FIG. 23. In Expression (4), F[ ] denotes the discrete Fourier transform, $\phi_0$ denotes a phase difference with the carrier, and $k_0$ denotes k corresponding to $f_0$, where $f_0 = k_0 \cdot fs/N$. On the basis of Expression (4), the FFT of the signal obtained by frequency-converting the received signal r(n) as shown in FIG. 3 has a form obtained by shifting R(k) serving as the FFT of r(n) by $k_0$ corresponding to the carrier frequency.

Figure 4:
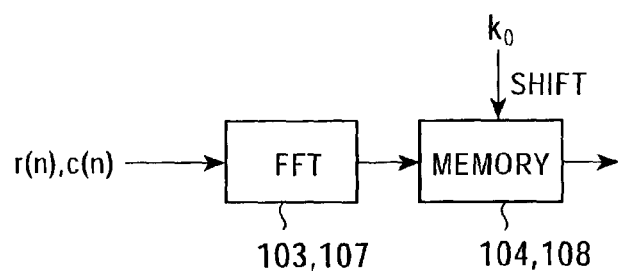
FIG. 4 is a diagram for explaining a method for acquiring carrier synchronization and spread-code synchronization with a received signal according to the embodiments of the present invention.

As mentioned above, the configuration in FIG. 3 can be replaced by a configuration as shown in FIG. 4. In other words, instead of multiplying the received signal r(n) or the spread code c(n) by the carrier frequency, the readout address used when the FFT result of the received signal is read from the memory 104 or when the FFT result of the spread code is read from the memory 108 is shifted by the amount corresponding to the carrier frequency.

In this case, in FIG. 4, when the received signal r(n) is shifted, down-conversion is used on condition that $k_0 > 0$. When the spread code c(n) is shifted, up-conversion is used on condition that $k_0 < 0$.

As mentioned above, when the characteristics of the FFT shown in Expression (4) are used, the signal generating unit 122 in FIG. 3 is not needed. As shown in FIG. 4, when the phase of the readout address of the FFT result in the memory is shifted, it is sufficient. Thus, the configuration is simplified, resulting in high-speed processing.

Since the phase difference $\phi_0$ in the foregoing Expression (4) is unknown, it is ignored in FIG. 4. For example, a correlation function f'(n) ($0 \leq n < N$), which is obtained as the operation result of inverse FFT of F'(k) calculated in Expression (5) of FIG. 23, represents a complex number. The real part thereof is designated by $f_R'(n)$ and the imaginary part thereof is designated by $f_I'(n)$. The amplitude |f'(n)| of the correlation peak is obtained as shown in Expression (6) of FIG. 23. The phase difference $\phi_0$ is obtained as shown in Expression (7) of FIG. 23. Accordingly, the multiplication of $\exp(j\phi_0)$ in the right-hand side of Expression (4) can be omitted. The phase difference $\phi_0$ represents two values different from each other by $\pi$ corresponding to the sign of the data d(n) in Expression (3).

Figure 5:
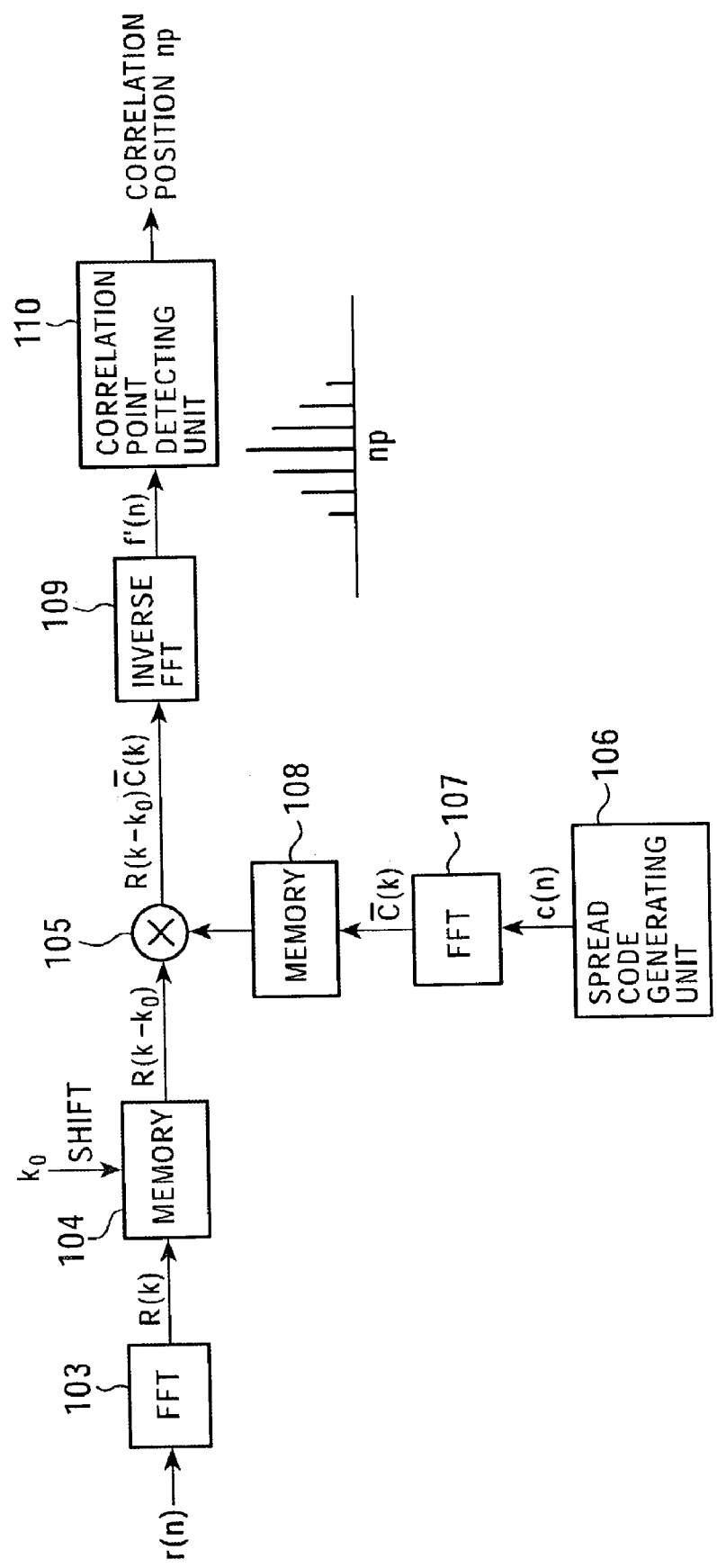
FIG. 5 is a diagram showing the configuration of an essential part considering the operation according to the first embodiment.

FIG. 5 is a diagram showing the configuration obtained by reflecting the processing operation according to the first embodiment as mentioned above to the block diagram in FIG. 1. In FIG. 5, the above-mentioned signal outputs r(n) and c(n) and the operation results R(k), $\overline{C}(k)$, and f'(n) are shown serving as outputs of the blocks.

As mentioned above, according to the method of the first embodiment, in the case of constructing the digital matched filter utilizing the FFT in the GPS receiver, as shown in FIG. 5, the address of the FFT result of the received signal in the memory is shifted by the amount corresponding to the carrier frequency and is then multiplied by the spread code. Thus, a correlation point np is obtained in a waveform as shown in, for example, FIG. 5. When the correlation points np of four GPS satellites, namely, four kinds of spread codes c(n) are detected, the position of the GPS receiver can be calculated.

In other words, according to the first embodiment, in the case of performing the digital matched filter process utilizing the FFT, in order to acquire the carrier synchronization and the spread-code synchronization with the received signal, the FFT result of the received signal is multiplied by the FFT result of the spread code in the frequency domain without multiplication in the time domain. Upon multiplication, one of the FFT results of the received signal and that of the spread code is shifted. With the simple method, the carrier components of the received signal can be removed.

In the example shown in FIG. 5, the readout address of the FFT result R(k) of the received signal in the memory is shifted. The readout address of the FFT result $\overline{C}(k)$ of the spread code in the memory can be shifted in the direction opposite to that of shifting the FFT result R(k) of the received signal (corresponding to up-conversion in a multiplier).

In the above description regarding the first embodiment, the spread code generating unit 106 and the FFT processing unit 107 are separately arranged. If the spread codes corresponding to respective GPS satellites are previously subjected to the FFT and the FFT results are stored in a memory, calculation for the FFT regarding the spread code c(n) upon reception of each satellite signal can be omitted.

[Second Embodiment]

Figure 6:
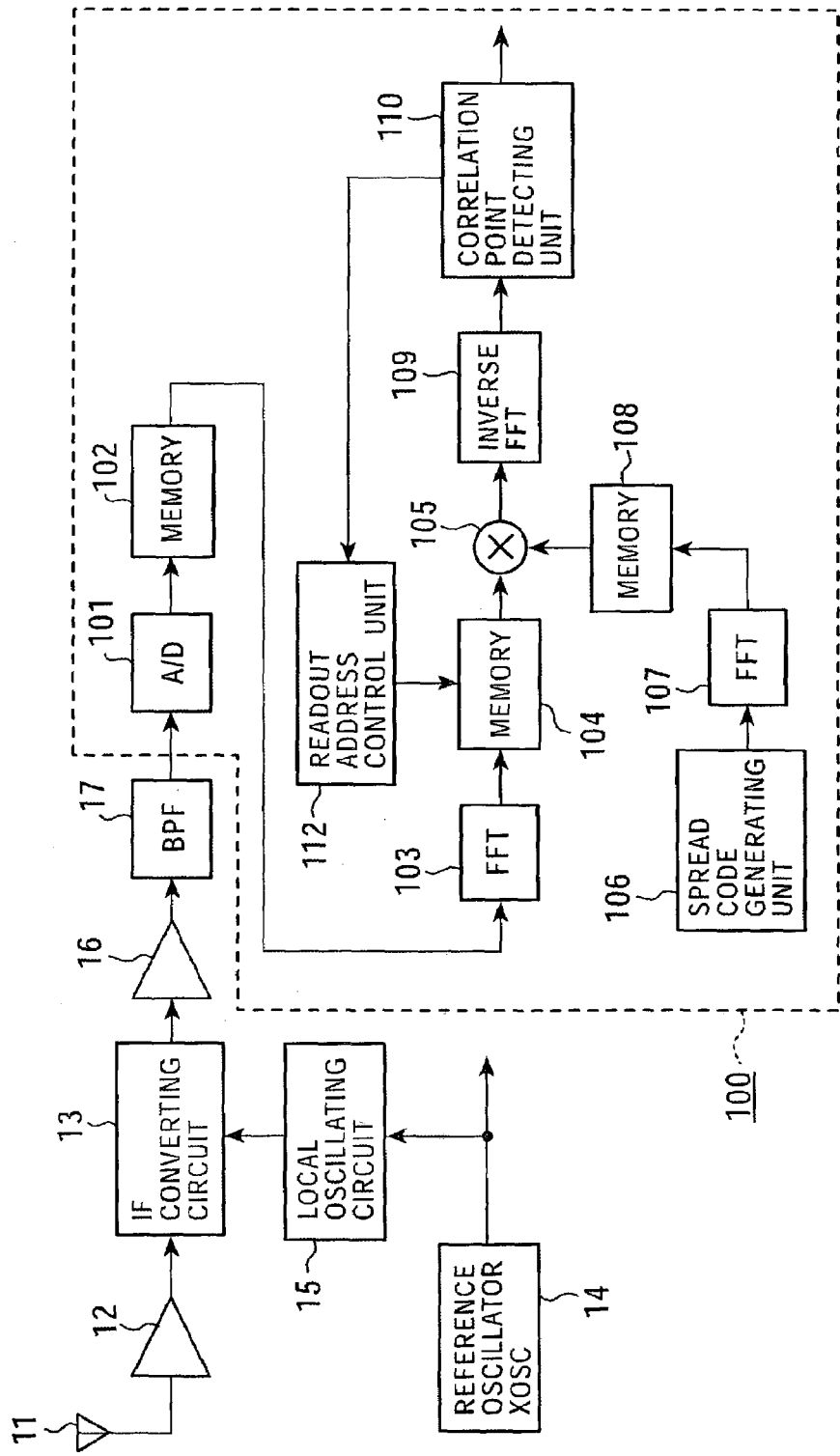
FIG. 6 is a block diagram showing the configuration of a GPS receiver of a spread spectrum signal demodulating apparatus according to a second embodiment of the present invention.

The foregoing first embodiment relates to the case where the carrier frequency of the received signal from the GSP satellite is known. A second embodiment relates to a case where a carrier frequency is unknown. FIG. 6 is a block diagram showing an example of the configuration of a GPS receiver according to the second embodiment. In FIG. 6, the same components as those in the GPS receiver in FIG. 1 according to the foregoing first embodiment are designated by the same reference numerals.

According to the second embodiment, as shown in FIG. 6, the correlation detection output of the correlation point detecting unit 110 is supplied to a readout address control unit 112. In the readout address control unit 112, the foregoing amount of shift of the readout address of the FFT result of the received signal r(n) in the memory 104 is changed on the basis of the correlation detection output of the correlation point detecting unit 110 mainly using a predictive address determined based on past data so as to allow the correlation point detecting unit 110 to detect a peak as shown in FIG. 2. When the correlation point detecting unit 110 detects the peak as shown in FIG. 2, the readout address control unit 112 stops the readout address shift control with the amount of shift at that time.

Figure 7:
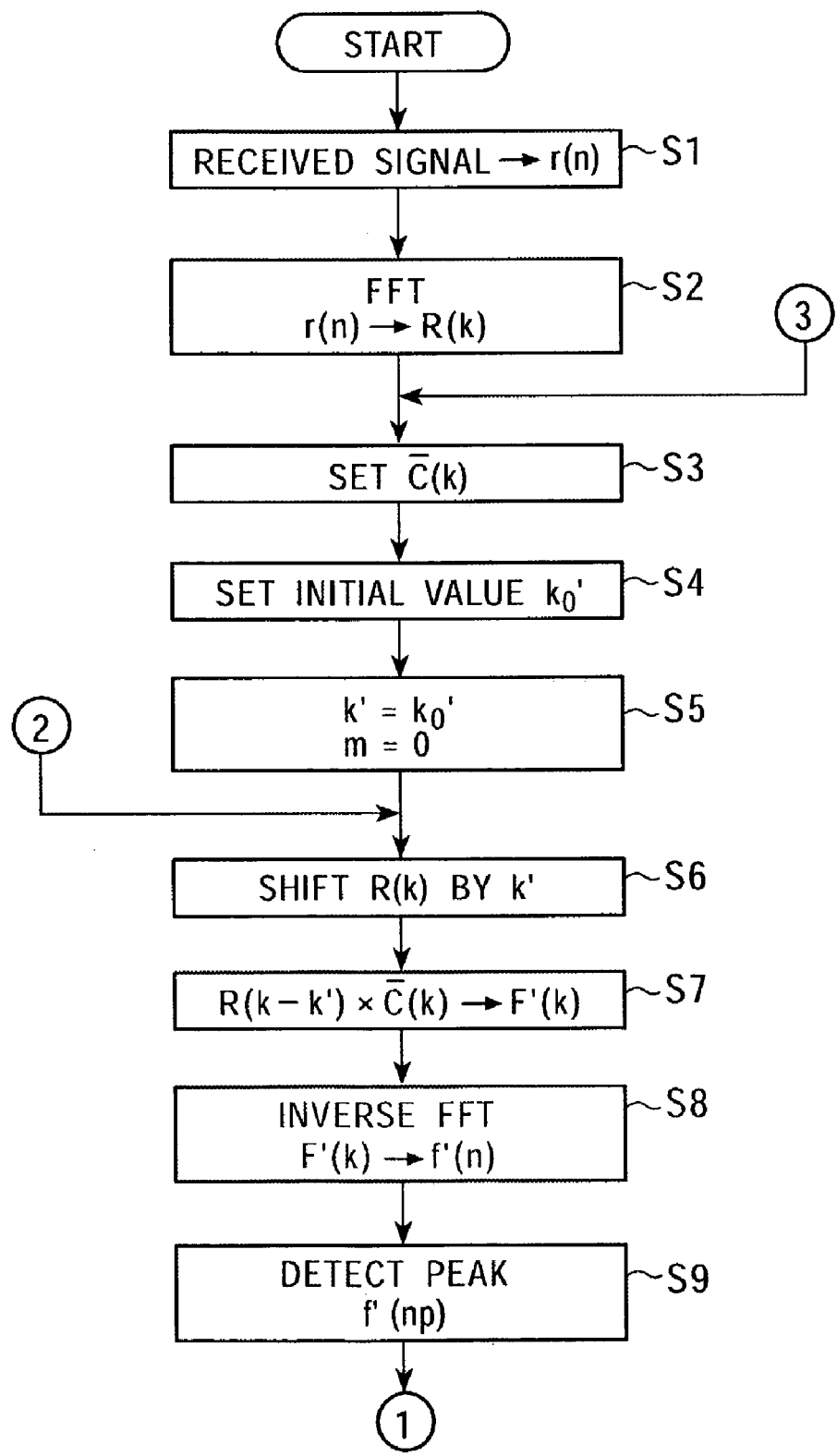
FIG. 7 is a part of a flowchart for explaining the operation according to the second embodiment.

Processing flow in the DSP 100 according to the second embodiment will now be described with reference to a flowchart in FIGS. 7 and 8. The flowchart in FIGS. 7 and 8 corresponds to software processing in the DSP 100.

First, a received signal converted into a digital signal by the A/D converting unit 101 is stored as the signal r(n) in the memory 102 (step S1). Subsequently, the signal r(n) is subjected to FFT by the FFT processing unit 103. The FFT result R(k) is stored in the memory 104 (step S2). Then, the FFT result $\overline{C}(k)$ of the spread code corresponding to the GPS satellite from which the signal is received is set in the memory 108 (step S3).

Subsequently, an initial value $k_0'$ serving as the amount of shift of the readout address of the FFT result R(k) of the received signal r(n) in the memory 104 is determined on the basis of past data (step S4). The determined initial value $k_0'$ is set as the amount k' of shift of the readout address of the FFT result in the memory 104 and the number of changing times m of the shift control is set to an initial value (m=0) (step S5).

Then, the FFT result R(k) of the received signal r(n) is read from the memory 104 so that the readout address is shifted by k' (step S6). The read FFT result R(k−k') is multiplied by the FFT result of the spread code to obtain the correlation function F'(k) (step S7).

Subsequently, the correlation function F'(k) is subjected to inverse FFT, thus obtaining the time-domain function f'(n) (step S8). With respect to the function f'(n), a peak value f'(np) is obtained (step S9). Whether the peak value is larger than a preset threshold value fth is determined (step S11).

As a result of the determination in step S11, if the peak value f'(np) is the preset threshold value fth or smaller, it is determined that the correlation point cannot be detected. Whether the number of changing times m in the shift control is smaller than a preset maximum value $m_{max}$ is determined (step S16). If it is determined that the number of changing times m in the shift control is smaller than the preset maximum value $m_{max}$, the number of changing times m in the shift control is increased by one (m=m+1) and the shift amount k' is newly set so that $k'=k'+(-1)^m \times m$ (step S17). After that, the operation is returned to step S6. The foregoing process in step S6 and the subsequent processes are repeated.

In step S16, if it is determined that the number of changing times m in the shift control is the preset maximum value $m_{max}$ or larger, whether the foregoing spread-code synchronization search process regarding all the satellites is finished is determined (step S14). If it is determined that the spread-code synchronization search process regarding all the satellites is finished, the search operation is finished (step S18).

In step S14, if it is determined that there is a satellite to which the spread-code synchronization search is not finished, the next satellite to be subjected to the spread-code synchronization search is selected. The spread code is changed to the spread code c(n) used in the selected satellite (step S15). The operation is returned to step S3 and the process in step S3 and the subsequent processes are executed.

In step S11, if it is determined that the peak value f'(np) is larger than the preset threshold value fth, discrete time (the phase of the spread code) np obtaining the peak value f'(np) is detected as the correlation point and the initial value $k_0'$ of the shift amount of the readout address of the FFT result R(k) in the memory 104 is reset to the shift amount k' at that time (step S12).

Whether the detected correlation point np is the fourth point is determined (step S13). If it is determined that it is the fourth point, the operation is shifted to a process of calculating the position of the receiver and a tracking process. On the basis of the shift amount k' of the readout address at the time when the correlation point np detected in step S12 is obtained, the amount of Doppler shift with respect to the GPS satellite which is being received and an error in the oscillation frequency of the GPS receiver can be estimated. In other words, the carrier frequency of the received signal can be detected.

In step S13, when it is detected that the detected correlation point np is less than the fourth point, whether the foregoing spread-code synchronization search process regarding all the satellites is finished is determined (step S14). When it is determined that the spread-code synchronization search process for all the satellites is finished, the search operation is completed (step S18).

In step S14, if it is determined that there is a satellite in which the spread-code synchronization search is not finished, the next satellite to be subjected to the spread-code synchronization search is selected. The spread code is changed to the spread code c(n) used in the selected satellite (step S15). The operation is returned to step S3 and the foregoing process in step S3 and the subsequent processes are executed.

Figure 8:
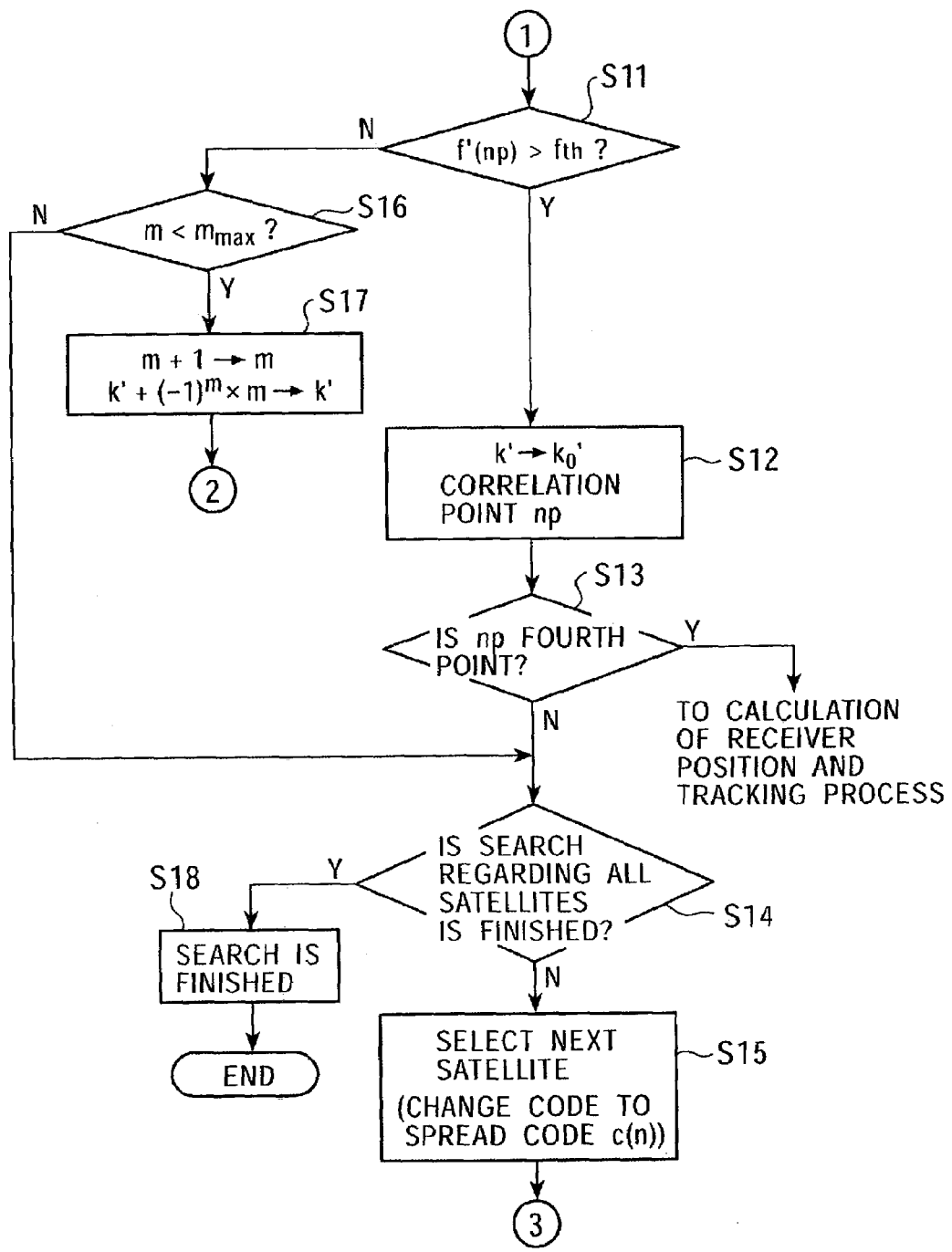
FIG. 8 is a part of the flowchart for explaining the operation according to the second embodiment.
Figure 9:
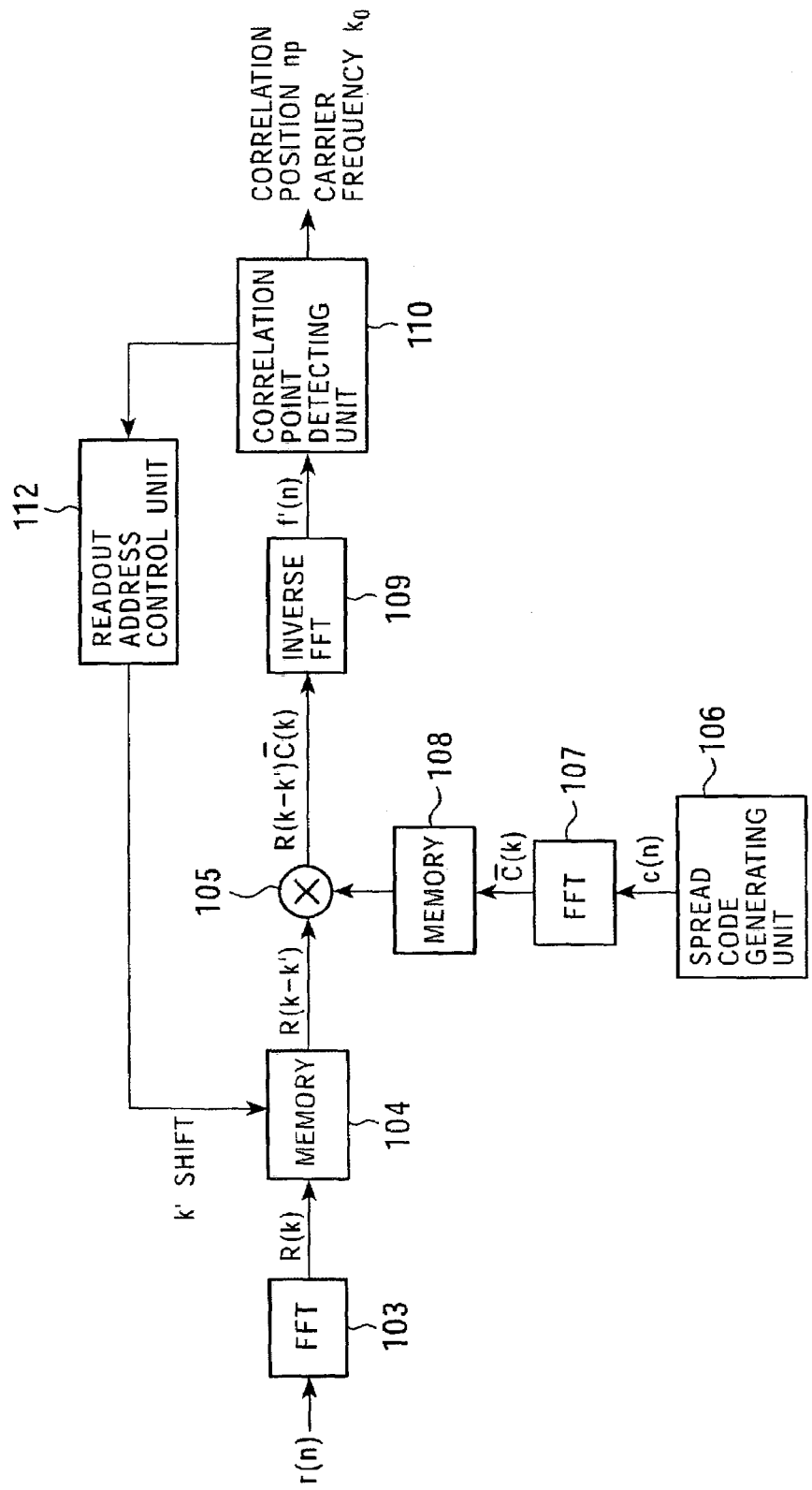
FIG. 9 is a diagram showing the configuration of an essential part considering the operation according to the second embodiment.

FIG. 8 shows a diagram of the configuration obtained by reflecting the above-mentioned processing operation according to the second embodiment to the block diagram showing the internal configuration of the DSP 100 in FIG. 6. The above-mentioned signal outputs and operation results are shown serving as outputs of respective blocks in FIG. 8.

As described above, according to the second embodiment, even if the carrier frequency of the received signal from the GPS satellite is unknown, the frequency-domain process utilizing the FFT is actively performed and the carrier synchronization and the spread-code synchronization with the received signal are detected, thus removing the carrier components. Therefore, the detection of the correlation point between the GPS received signal and the spread code by the digital matched filter utilizing the FFT can be realized at high speed with a simple construction.

In the second embodiment, similarly, if the spread codes corresponding to the respective satellites are subjected to the FFT and the FFT results are stored in the memory, calculation for the FFT of the spread code c(n) upon reception of each satellite signal can be omitted.

[Third Embodiment]

As mentioned above, when the correlation point between the received signal and the spread code is detected using the digital matched filter, the unit data length used to detect the correlation point is generally set to one period length of the spread code.

However, in the received signal from the GPS satellite, as mentioned above, one bit of data corresponds to 20 periods of the spread code. For the 20 periods, the same pattern codes are obtained. According to a third embodiment, using such characteristics, the unit data length used to detect the correlation point between the received signal and the spread code by the digital matched filter is set to a length corresponding to plural periods of the spread code.

According to the third embodiment, as mentioned above, the received signal is subjected to the FFT operating process every plural periods of the spread code, resulting in an increase in the reception sensitivity. Accordingly, as compared with the method for cumulatively adding signals in the same time domain, the carrier frequency can be easily searched. The third embodiment will now be described in more detail.

There is a related art for detecting the correlation point of data of one period length cumulatively added for M periods (M is the power of two that is two or more, the same applying to those that follow) of the spread code (refer to, for example, U.S. Pat. No. 4,998,111 or "An Introduction to Snap Track™ Server-Aided GPS Technology, ION GPS-98 Proceedings").

Figure 10:
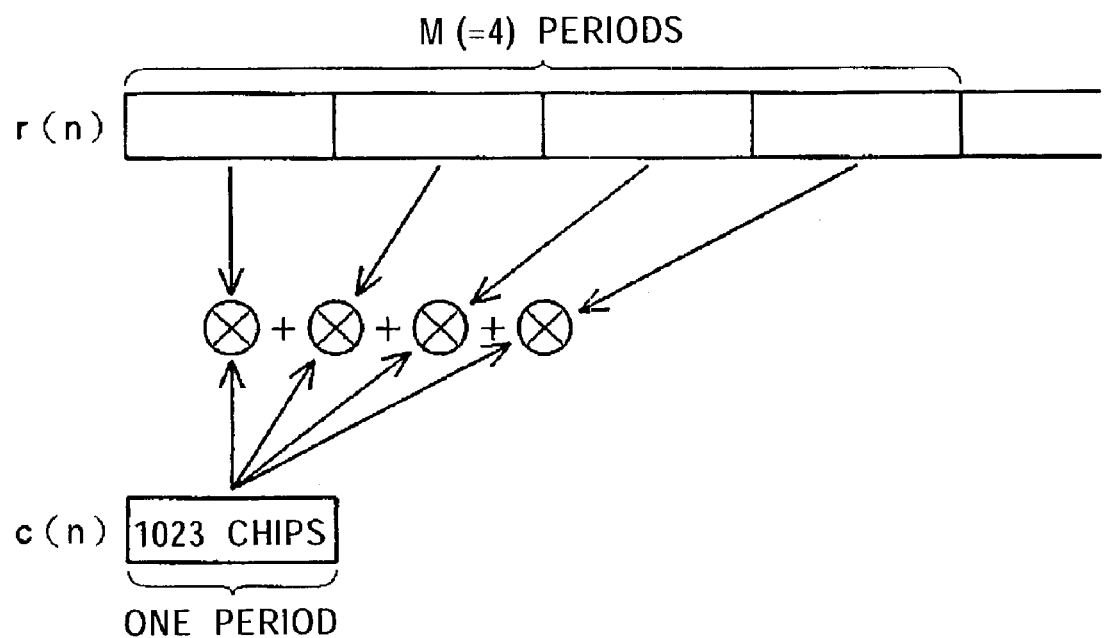
FIG. 10 is a diagram for explaining a spread spectrum signal demodulating apparatus according to a third embodiment of the present invention.

In other words, according to the method of the related art, as shown in FIG. 10, the results of the multiplication of the received signal r(n) by the spread code are accumulated and added for M periods. According to the method of the related art, the C/N is raised using the periodicity of the received signal from the GPS satellite and the statistical characteristics of noises. When the carrier synchronization and the code-spread synchronization with the received signal are previously acquired, the C/N is increased by M times. Therefore, the reception sensitivity (detection sensitivity of the correlation point) is increased by M times.

However, when the carrier synchronization and the spread-code synchronization with the received signal are not acquired, M carriers having different phases are added and combined with each other. In the cumulative addition result, the important GPS signal is cancelled and the correlation peak cannot be detected.

Accordingly, when the carrier frequency of the received signal is unknown, it is necessary to search the carrier frequency. Consequently, cumulative addition for each frequency to be searched, in other words, the inefficient operation has to be performed.

On the other hand, in the foregoing first and second embodiments, as mentioned above, according to the simple method for shifting the readout address of the FFT result in the memory in the frequency domain, the carrier synchronization and the spread-code synchronization with the received signal can be acquired. Thus, the advantage of the cumulative addition can be most effective.

According to the third embodiment, in the same case as the second embodiment, the carrier frequency is searched on condition that the carrier frequency of the received signal from the GPS satellite is unknown. In this case, the received signal r(n) is subjected to the FFT every M periods of the spread code. The carrier frequency of the received signal is searched every M periods of the spread code by controlling the shift amount of the readout address of the FFT result of the received signal in the memory.

When $M \leq 20$, the data d(n) in Expression (3) of FIG. 23 mentioned above represents a fixed value of 1 or −1 for M periods of the spread code. Accordingly, the data d(n) is negligible. Thus, Expression (3) is expressed as follows.

$$r(n) = A \cdot c(n) \cos 2\pi n f_0 + n(n)$$

The received signal r(n) is subjected to the discrete Fourier transform in a M-period length. Since the number of data is 1×N (N denotes the number of chips for one period of the spread code), the relationship between k obtained after the discrete Fourier transform and the real frequency f with respect to the sampling frequency fs is expressed as f=kfs/MN on condition that $0 \leq k \leq MN/2$. When MN/2<k<MN, f=(k−MN)fs/MN (f<0). Thus, resolving power is increased by M times.

Figure 11:
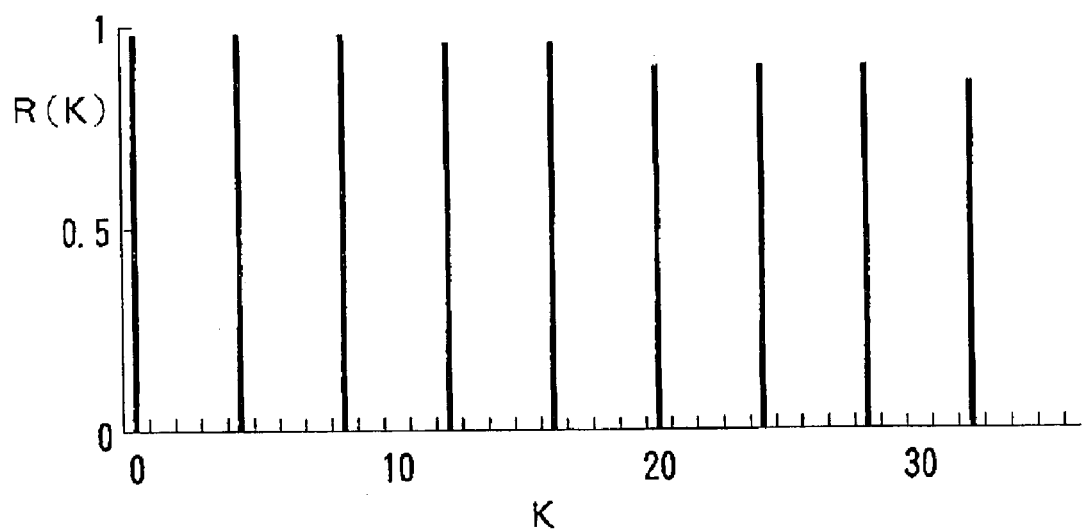
FIG. 11 is a graph for explaining the spread spectrum signal demodulating apparatus according to the third embodiment of the present invention.

However, the spread code c(n) is a periodic signal. When time corresponding to one period length is set to T (T=one millisecond in the C/A code of the GPS), there is no frequency component having accuracy of f=1/T or lower. Therefore, the frequency components of the spread code c(n) in the FFT result R(K) (K=kM, $0 \leq K < MN$) of the received signal r(n) subjected to the discrete Fourier transform are concentrated every M, namely, on N points of MN data. Since the amplitudes of the frequency components are cumulatively added for M periods, the amplitudes are M times as high as those of the same frequency components for one period length. FIG. 11 shows an example of spectrum on condition that M=4.

In the example of FIG. 11, the spectrum of the signal is generated every four. There is no signal component therebetween. There is no frequency component of the spread code c(n) at points other than N points. On the other hand, in many cases, the noise n(n) is a non-periodic signal. Accordingly, energy is spread to all of MN frequency components. Therefore, in the sum of N frequency components of the spread code c(n) in the FFT result R(K) of the received signal r(n), the C/N is increased by M times in a manner similar to the cumulative addition in the time domain.

If there is no carrier component $\cos 2\pi n f_0$ shown in Expression (3) in the received signal r(n), the frequency components of the spread code c(n) in the FFT result R(K) are concentrated every K=j×M ($0 \leq j < N$). However, the carrier components exist. According to the third embodiment, on condition that k=(i×M)−$k_0$ per period of the spread code, the readout address of the FFT result R(K) in the memory is periodically shifted by $k_0$ corresponding to the carrier frequency.

Figure 12:
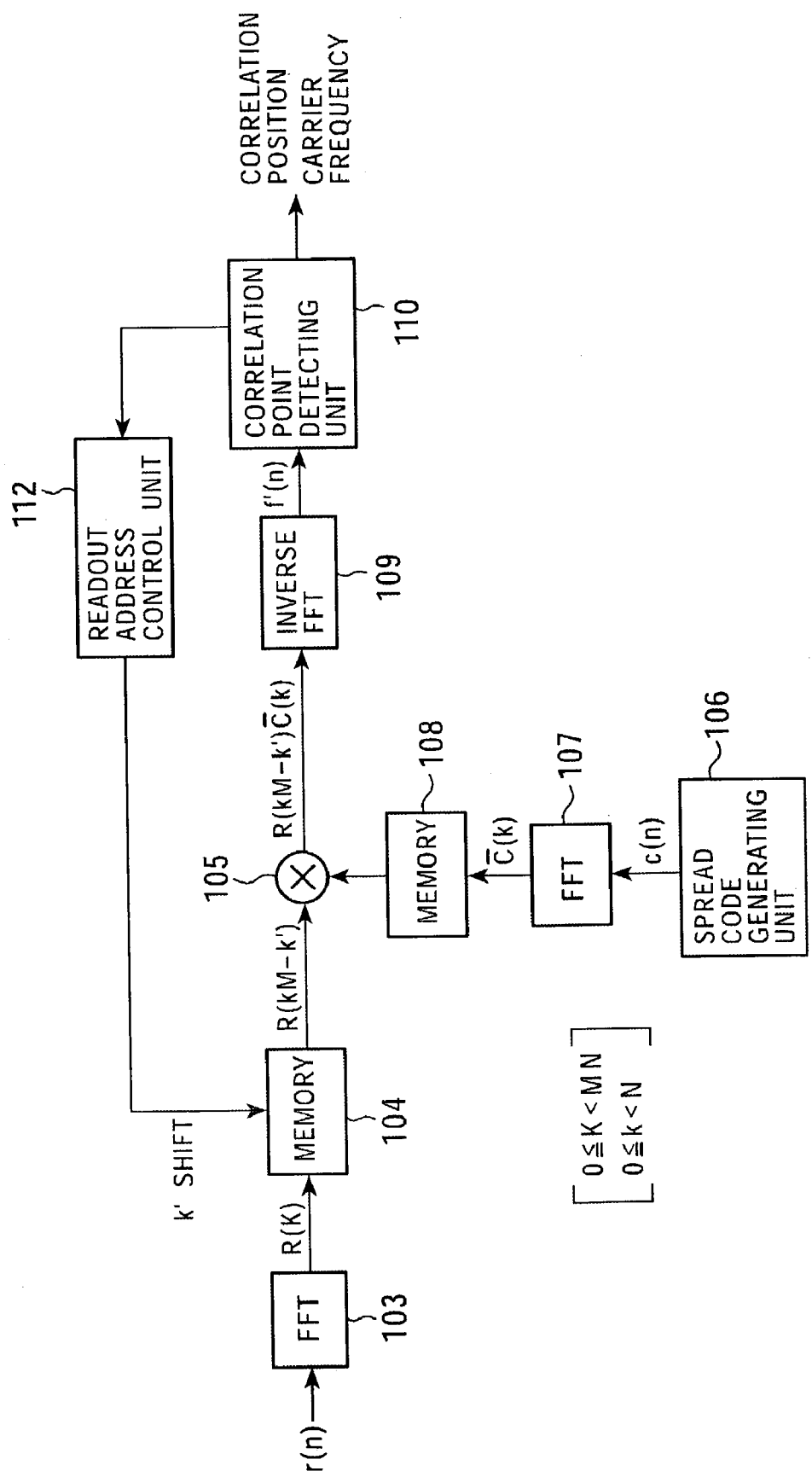
FIG. 12 is a diagram showing the configuration of an essential part considering the operation according to the third embodiment.
Figure 13:
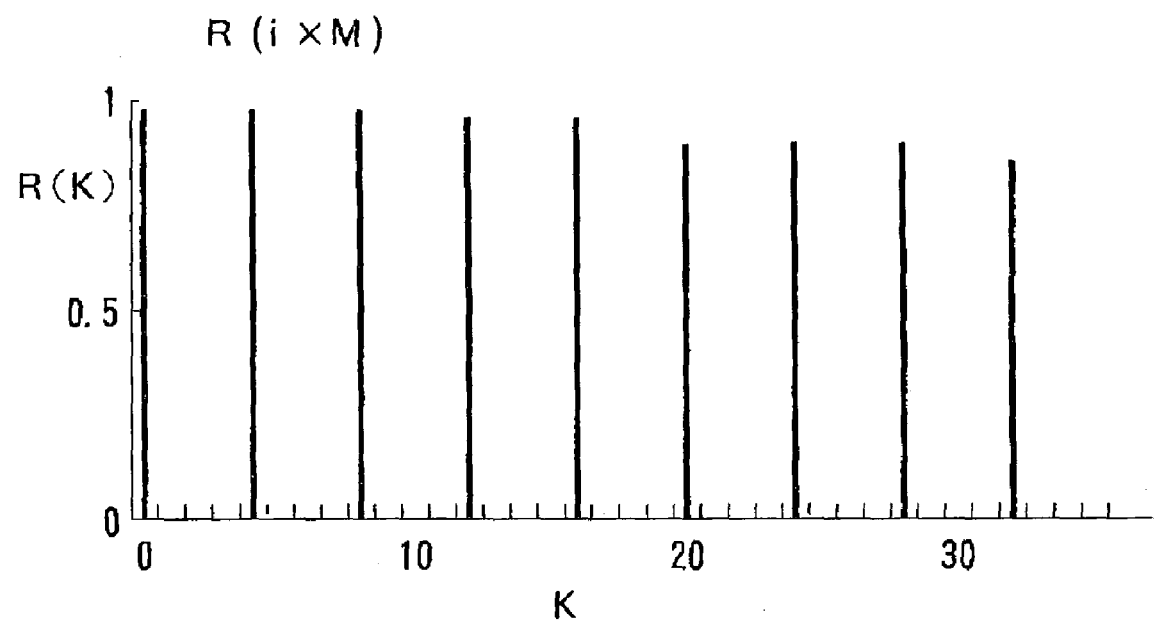
FIG. 13 is a graph for explaining a spread spectrum signal demodulating apparatus according to a fourth embodiment of the present invention.
Figure 14:
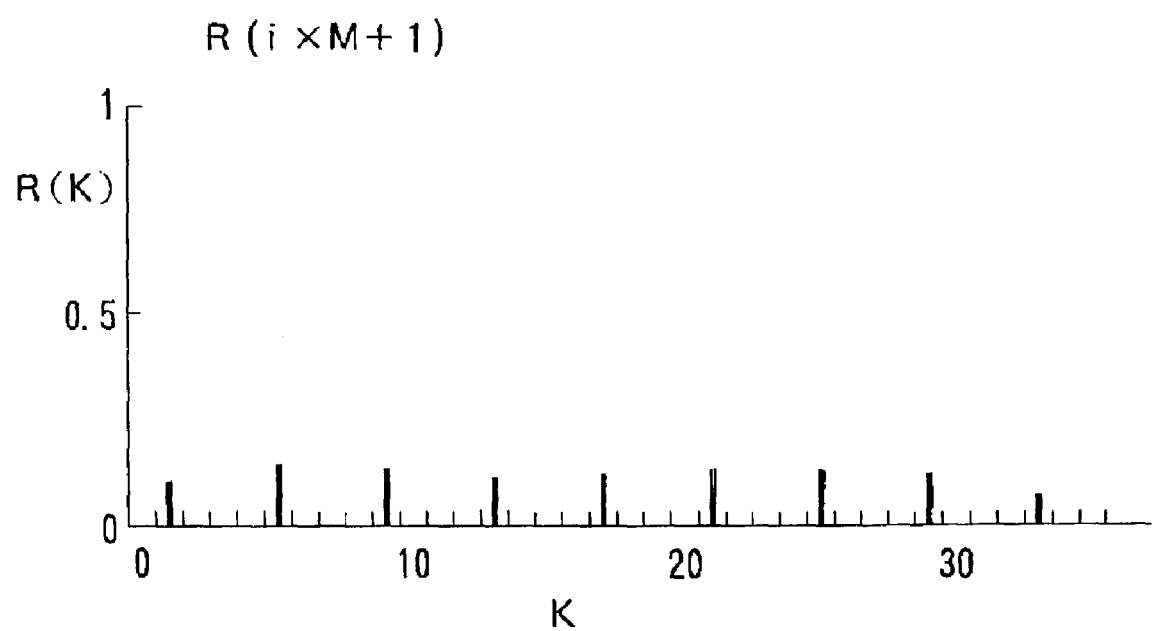
FIG. 14 is a graph for explaining a spread spectrum signal demodulating apparatus according to the fourth embodiment of the present invention.
Figure 15:
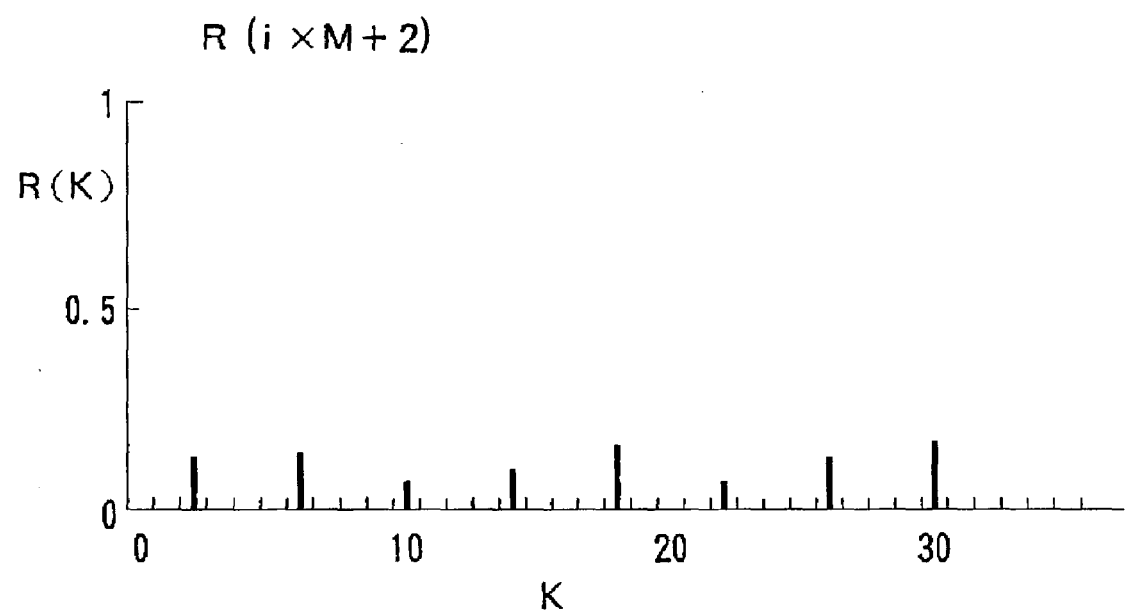
FIG. 15 is a graph for explaining the spread spectrum signal demodulating apparatus according to the fourth embodiment of the present invention.
Figure 16:
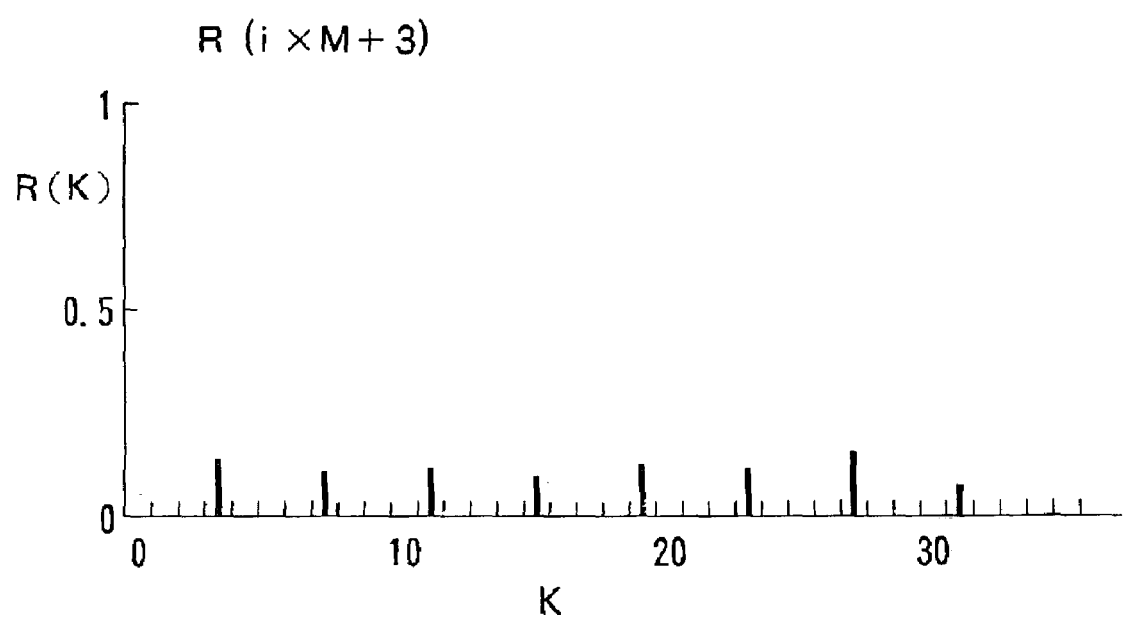
FIG. 16 is a graph for explaining the spread spectrum signal demodulating apparatus according to the fourth embodiment of the present invention.

The above-mentioned whole configuration according to the third embodiment is similar to that of the second embodiment shown in FIG. 6. FIG. 12 shows a diagram of the configuration obtained by reflecting the foregoing processing operation to the internal configuration of the DSP 100.

In other words, the FFT result R(K) obtained by setting the FFT operation processing unit as M periods of the spread code is obtained in the FFT processing unit 103. The FFT result R(K) is stored in the memory 104. The readout address is shifted and the FFT result is read from the memory 104. The FFT result is supplied to the multiplying unit 105 and is then multiplied by the FFT result of the spread code c(n) from the memory 108.

In the case of the third embodiment, correlation function F(k) obtained by the multiplying unit 105 is set so as to satisfy Expression (8) of FIG. 23. In Expression (8), for $k_0$, $f_0 = k_0 \cdot fs/MN$.

At this time, in FIG. 12, for the peak of the correlation function f'(n) obtained by the inverse FFT processing unit 109, since R(K) contains the spread code of M periods, the M peaks appear in a range of $0 \leq n < MN$. However, when one correlation point is detected for one period of the spread code, it is sufficient. Therefore, in a manner similar to the foregoing first and second embodiments, the calculation in the inverse FFT processing unit 109 is performed only in a rage of $0 \leq n < N$. It is unnecessary to perform the calculation in a range of $N \leq n < MN$.

As mentioned above, according to the third embodiment, the FFT of the received signal r(n) is increased by a value that is M times as high as the FFT of one period of the spread code. Thus, the detection sensitivity of the correlation point, namely, the reception sensitivity can be increased.

In the third embodiment, when the spread codes corresponding to the respective satellites are subjected to the FFT and the FFT results are stored in the memory, the calculation for the FFT of the spread code c(n) upon reception of each satellite signal can be omitted.

[Fourth Embodiment]

In the foregoing third embodiment, the reception signal r(n) corresponding to the M periods (M>1) of the spread code is subjected to the FFT process. Thus, an unknown carrier frequency can be searched and the reception sensitivity can be increased. However, the number of data samples is increased to MN, namely, the number of data samples N for one period of the spread code is increased by M times. Therefore, calculation time for the FFT is extended and the capacity of the memory 104 in FIG. 12 is increased. According to a fourth embodiment, the disadvantage regarding the memory capacity is overcome.

As shown in the example in FIG. 11, in the case where the M periods (M>1) of the spread code are set as the FFT processing unit, the frequency components in the FFT result R(K) appear every M. Accordingly, the components between the frequency components existing every M are not needed.

The FFT results R(K) are divided into M sets, namely, R(i×M), R(i×M+1), R(i×M+2), . . . , and R(i×M+M−1) ($0 \leq j < N$). FIGS. 13 to 16 show examples each illustrating division spectrum when the FFT results are divided into M=4 sets. Although a carrier frequency is unknown, one of the M sets has energy of a GPS signal serving as a correlation detection target. The examples in FIGS. 13 to 16 show that the set of R(i×M) in FIG. 13 includes the frequency components of the received signal r(n) and the other three division spectrum include noises.

In the actual signal, for the carrier frequency $k_0$, in the strict sense, k' is not equal to $k_0$. For example, when $k_0$ exists between $k_0'$ and $k_0'+1$, the correlation is detected at both of $k'=k_0'$ and $k'=k_0'+1$. $k_0'$ or $k_0'+1$ which is closer to $k_0$ denotes the large correlation.

In the case where the FFT results R(K) are divided into M sets as mentioned above, when M is the power of two, each set can be individually calculated in terms of the characteristics of the FFT calculation procedure.

Figure 17:
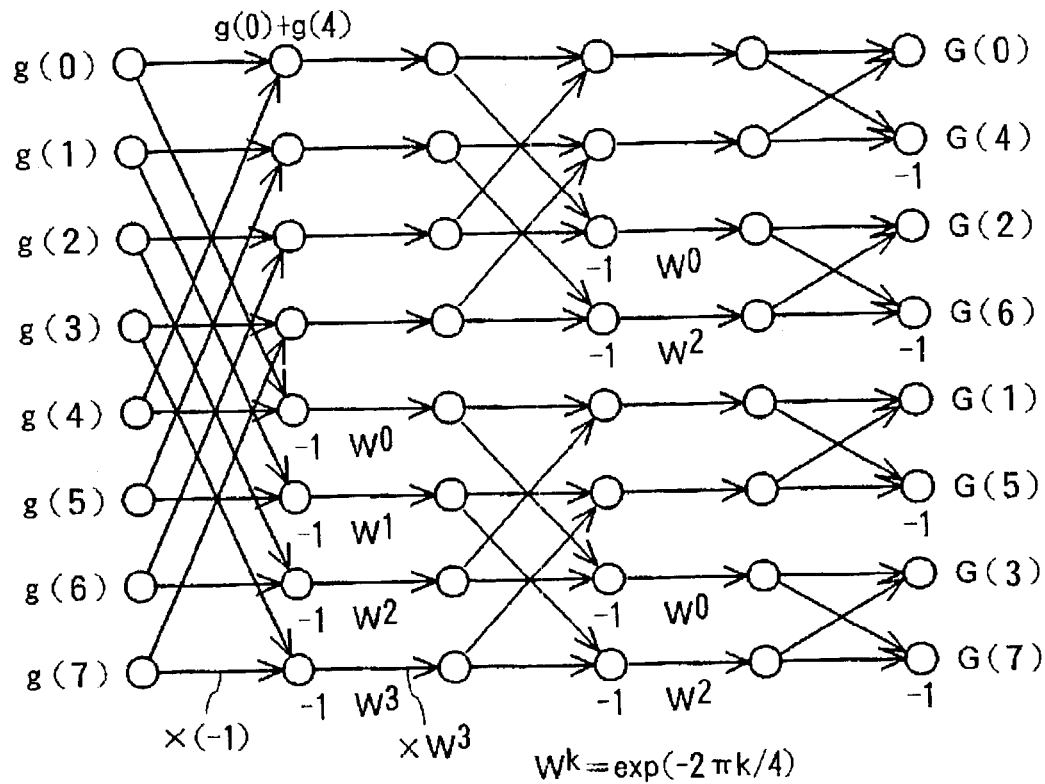
FIG. 17 is a diagram used in the explanation regarding the essential part according to the fourth embodiment.
Figure 18:
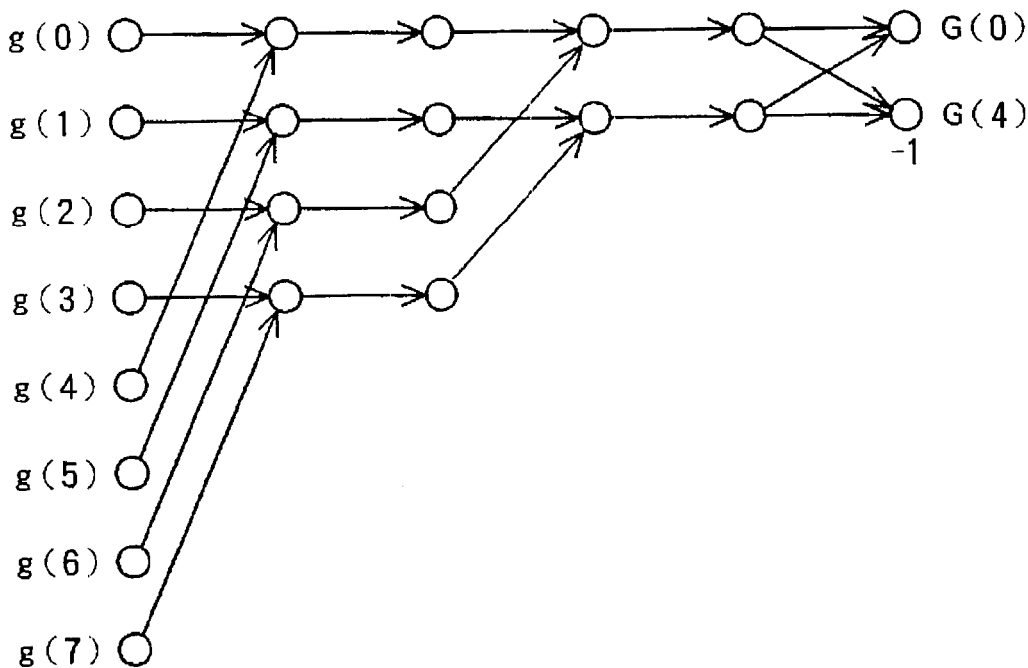
FIG. 18 is a diagram used in the explanation regarding the essential part according to the fourth embodiment.

FIG. 17 is a signal flow diagram for the FFT calculations of eight data g(0) to g(7). When the FFT results G(K) in FIG. 17 are divided into sets so that data is selected every four, four sets of (G(0), G(4)), (G(1), G(5)), (G(2), G(6)), and (G(3), G(7)) are obtained. When attention is paid to (G(0), G(4)) among them, it is understood that the set can be obtained by calculating a portion shown in FIG. 18. The other sets of (G(1), G(5)), (G(2), G(6)), and (G(3), G(7)) can be obtained using the similar calculation structure.

Each set of the four sets of data will now be inspected. First, (G(0), G(4)) is calculated. When the set is inspected, a memory in which (G(0), G(4)) is stored is freed up and the next set is processed. The sets of (G(1), G(5)), (G(2), G(6)), and (G(3), G(7)) are similarly processed so that each set is sequentially calculated and is then inspected, and after that, the memory in which the corresponding set is stored is freed up. Accordingly, the memory capacity can be reduced to ¼ as compared with the case where the FFT results of G(0) to G(7) are simultaneously obtained. The number of multiplying times in the case where plural data is divided into M sets and each set is calculated is the same as that in the case where all of plural data are simultaneously FFT-calculated.

When M is the power of two, the same operation as that in the above example can be applied to R(i×M), R(i×M+1), R(i×M+2), . . . , and R(i×M+M−1). The capacity of a memory storing the FFT results can be reduced to 1/M of MN, namely, N. During the operation of detecting the correlation in R(i×M), R(i×M+1), R(i×M+2), . . . , and R(i×M+M−1) in this order, if the correlation point can be detected in any set, it is unnecessary to inspect the other remaining sets. Accordingly, it can be expected that processing time is shorter than that in the case where received signals every M periods of the spread code are simultaneously subjected to the FFT and the correlation point is then detected.

Figure 19:
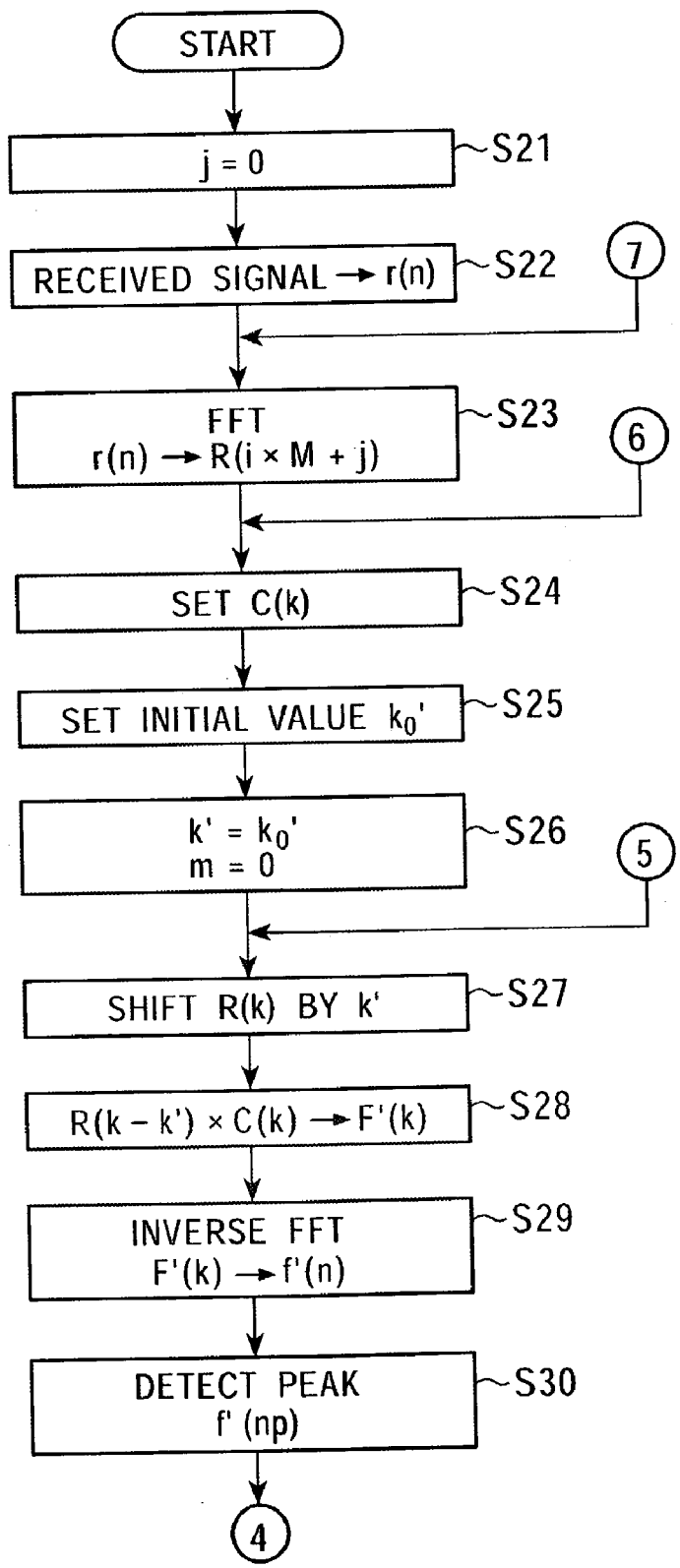
FIG. 19 is a part of a flowchart for explaining the operation according to the fourth embodiment.
Figure 20:
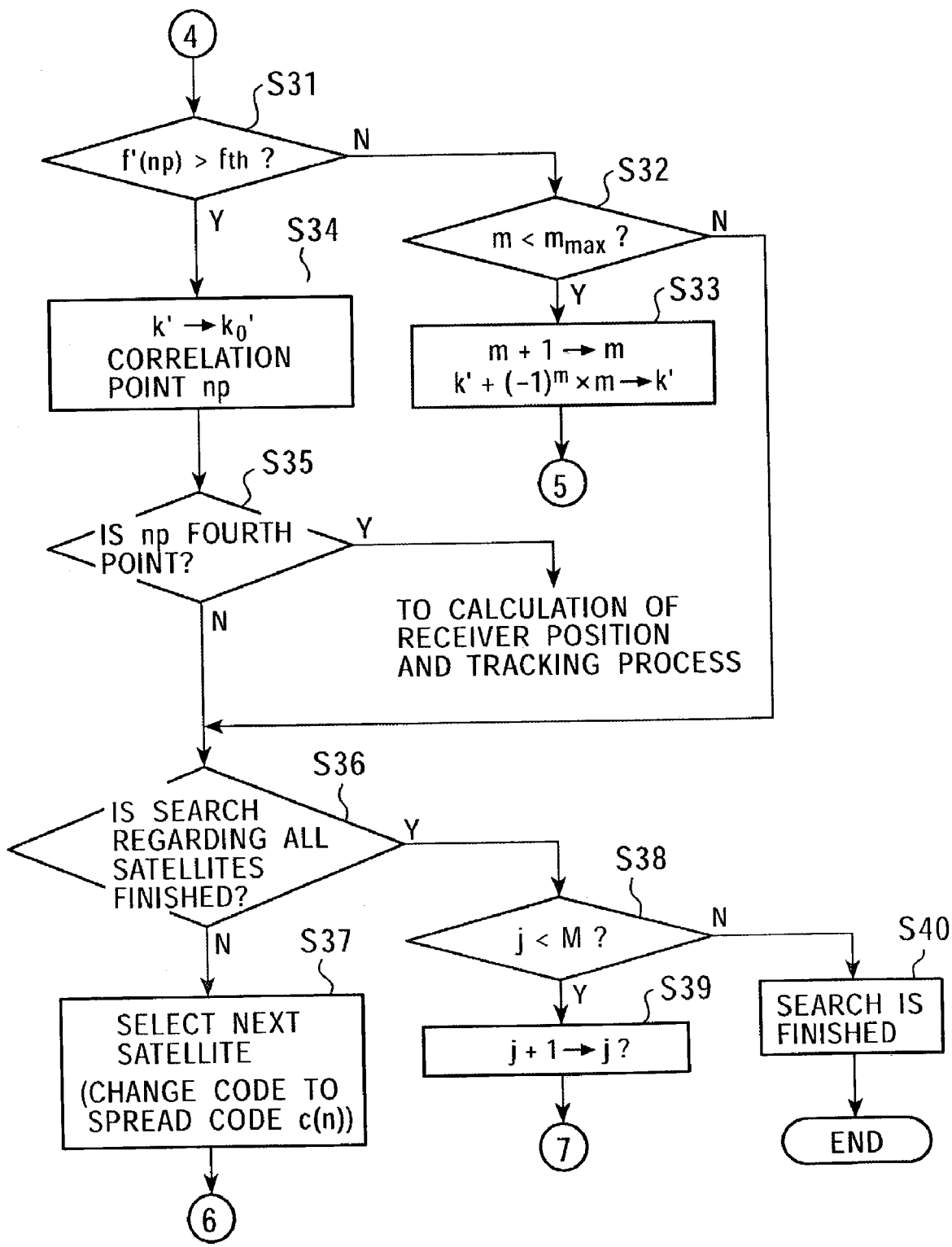
FIG. 20 is a part of the flowchart for explaining the operation according to the fourth embodiment.
Figure 21:
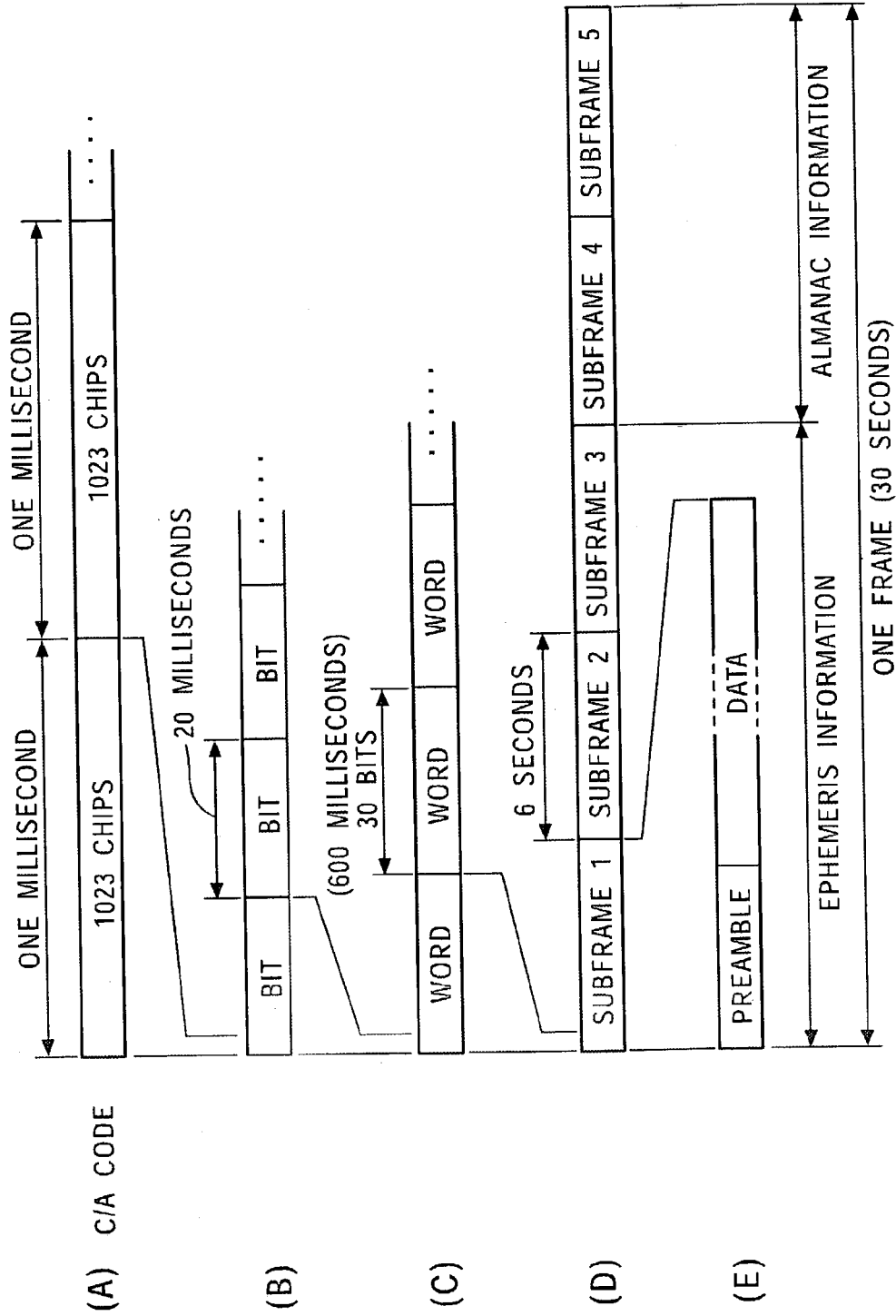
FIG. 21 includes diagrams explaining the construction of a signal transmitted from a GPS satellite.
Figure 22:
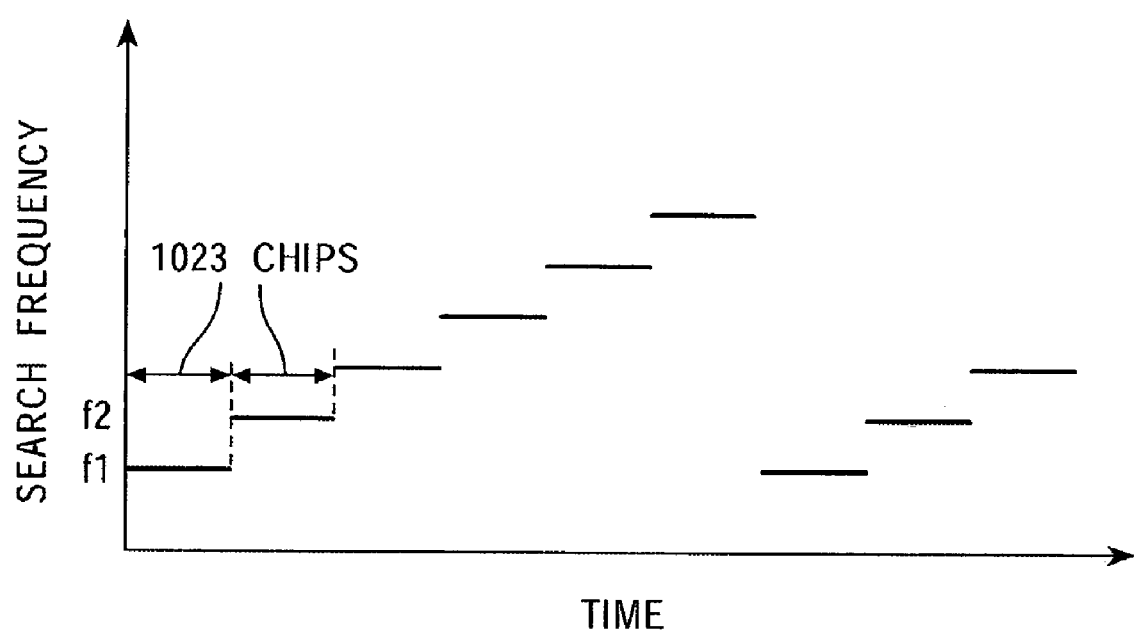
FIG. 22 is a graph for explaining a conventional process for carrier synchronization and spread-code synchronization.

FIGS. 19 and 20 shows a flowchart of the spread-code synchronization and the carrier synchronization according to the above-described fourth embodiment. In the example in FIGS. 19 and 20, in order to minimize the number of FFT times, the carrier frequency is searched every FFT set so that the correlation detection is performed to all satellites serving as objects. The flowchart shown in FIGS. 19 and 20 corresponds to software processing in the DSP 100.

First, a variable j ($0 \leq j \leq M$) regarding the number of division sets of R(k) is initialized (step S21). Subsequently, a received signal converted into a digital signal by the A/D converting unit 101 is stored as a signal r(n) ($0 \leq n \leq MN$) in the memory 102 (step S22). Then, the signal r(n) is subjected to the FFT by the FFT processing unit 103. A FFT result R(k) (k=i×M+j) is stored in the memory 104 (step S23). Subsequently, a FFT result C(k) of the spread code corresponding to the GPS satellite from which the signal is received is set in the memory 108 (step S24).

Then, an initial value $k_0'$ of the shift amount of the readout address of the FFT result R(k) of the received signal r(n) in the memory 104 is determined on the basis of, for example, past data (step S25). The determined initial value $k_0'$ is set to the amount k' of shift of the readout address of the FFT result in the memory 104 and the number of changing times m in the shift control is set to an initial value (m=0) (step S26).

Subsequently, the FFT result R(k) of the received signal r(n) is read from the memory 104 so that the readout address is shifted by k' (step S27). A read FFT result R(k−k') is multiplied by the FFT result of the spread code to obtain a correlation function F'(k) (step S28).

Subsequently, the correlation function F'(k) is subjected to inverse FFT to obtain a time-domain function f'(n) (step S29). A peak value f'(np) of the function f'(n) is obtained (step S30). Whether the peak value f'(np) is larger than a preset threshold value fth is determined (step S31).

In step S31, if it is determined that the peak value f'(np) is the preset threshold value fth or smaller, the correlation point cannot be detected. Then, whether the number of changing times m in the shift control is smaller than the preset maximum value $m_{max}$ is determined (step S32). When it is determined that the number of changing times m in the shift control is smaller than the preset maximum value $m_{max}$, the number of changing times m in the shift control is increased by one (m=m+1) and the new shift amount k' is set so that $k'=k'+(-1)^m \times m$ (step S33). The operation is returned to step S27. The foregoing process in step S27 and the subsequent processes are repeated.

In step S32, if it is determined that the number of changing times m in the shift control is the preset maximum value $m_{max}$ or larger, whether the foregoing spread-code synchronization search process regarding all satellites is finished is determined (step S36). When it is determined that the spread-code synchronization search process regarding all the satellites is finished, whether the variable j is smaller than the maximum value M is determined (step S38). When the variable j is smaller than the maximum value M, the variable j is increased (step S39). After that, the operation is returned to step S23 and the process in step S23 and the subsequent processes are repeated.

In step S38, when it is determined that the variable j is equal to the maximum value M or larger, the search operation is finished (step S40).

In step S36, when it is determined that there is a satellite to which the spread-code synchronization search is not performed, the next satellite to which the spread-code synchronization search is performed is selected and the spread code is changed to the spread code c(n) used in the selected satellite (step S37). The operation is returned to step S24. The foregoing process in step S24 and the subsequent processes are executed.

In step S31, if it is determined that the peak value f'(np) is larger than the preset threshold value fth, discrete time (phase of the spread code) np at which the peak value f'(np) is obtained is detected as the correlation point. The initial value $k_0'$ of the shift amount of the readout address of the FFT result R(k) in the memory 104 is reset to the shift amount k' at that time (step S34).

Whether the detected correlation point np is the fourth point is determined (step S35). If it is determined that the point is the fourth, the operation is shifted to a process of calculating the receiver position and a tracking process. On the basis of the shift amount k' whereby the correlation point np detected in step S34 is obtained, the amount of Doppler shift for the GPS satellite which is being received and an error in the oscillation frequency of the GPS receiver can be estimated.

In step S35, if the detected correlation point np is less than the fourth point, the operation proceeds step S36 and the foregoing process in step S36 and the subsequent processes are executed.

When the carrier frequency is known in the same case as the first embodiment, the corresponding results of R(i×M), R(i×M+1), R(i×M+2), ..., and R(i×M+M−1) are calculated. Accordingly, the method for performing the FFT to the received signal using time including plural periods of the spread code as a unit can be similarly used.

According to the above-mentioned first to fourth embodiments, in the method for spread-code and carrier acquisition in the GPS receiver, it can be expected that processing time is remarkably reduced utilizing the high-speed DSP, as compared with the use of a sliding correlator serving as the conventional technique, the sliding correlator basically requiring long time.

In the above embodiments, the present invention is applied to the case using the received signals from the GSP satellites. The present invention is not limited to the case using signals from the GPS satellites. The present invention can be applied to all cases of performing the spread-code and carrier acquisition with a received signal, of which carrier is modulated with a signal obtained by spectrum-spreading data with a spread code.

As mentioned above, according to the present invention, in the digital matched filter process using the FFT, multiplication with the oscillator in the time domain is not performed. When the FFT result of the received signal is multiplied by the FFT result of the spread code, the FFT result of any one of them is shifted. In the simple manner, the carrier components can be removed.

The method for performing the FFT to a received signal using plural periods of the spread code serving as a processing unit is used. Consequently, the reception sensitivity is increased. Advantageously, the carrier frequency can be easily searched as compared with a method of cumulatively adding signals in the time domain for the same purpose. Since the reception sensitivity is increased, miniaturization of an antenna and an increase in receiving area can be expected.

A sliding correlator, serving as the conventional technique, basically requires long time until synchronization is acquired. According to the present invention, processing time can be remarkably reduced using the high-speed DSP. Thus, there is an advantage in that the response of the GPS receiver is raised.

The invention claimed is:

1. A spread spectrum signal demodulating method comprising the steps of:

performing a fast Fourier transform on a received signal having carrier wave modulated with a signal obtained by spectrum-spreading data with a spread code and storing a result of the fast Fourier transform in a first memory;

reading out the result of the fast Fourier transform of the received signal stored in the first memory and a fast Fourier transform result of the spread code for storing in a second memory and multiplying the result of the first Fourier transform of the received signal and the fast Fourier transform result of the spread code to detect the correlation between the received signal and the spread code;

shifting a readout address of one of the fast Fourier transform result of the received signal and the fast Fourier transform result of the spread code by an amount corresponding to a carrier frequency of the received signal, and reading the fast Fourier transform result from one of the first memory and the second memory; and performing an inverse fast Fourier transform to a result of the step of multiplying to detect a correlation point between the received signal and the spread code;

wherein the fast Fourier transform of the received signal and the fast Fourier transform of the spread code are performed every M periods, where M is a power of two that is two or more, of the spread code, wherein in the fast Fourier transform of the received signal all frequency components of the received signal are not simultaneously calculated, the fast Fourier transform is divided into L times, where L is an integer of two or more, so that same calculation structure components in the fast Fourier transform are set to a unit, and the fast Fourier transform of the received signal is performed every 1/L.

2. A spread spectrum signal demodulating apparatus comprising:

fast Fourier transform means for performing a fast Fourier transform on a received signal having a carrier wave modulated with a signal obtained by spectrum-spreading data with a spread code;

a first memory in which a result of the fast Fourier transform of the received signal obtained by the fast Fourier transform means is stored;

a second memory in which a result of fast Fourier transform of the spread code used in modulating the received signal is stored;

multiplying means for multiplying the fast Fourier transform result of the received signal read from the first memory by the result of the fast Fourier transform of the spread code read from the second memory;

memory control means for shifting a readout address of one of the fast Fourier transform result of the received signal and the fast Fourier transform result of the spread code by an amount corresponding to a carrier frequency of the received signal and reading the fast Fourier transform result from one of the first memory and the second memory;

inverse fast Fourier transform means for performing an inverse fast Fourier transform on a result obtained by the multiplying means to obtain a correlation detection output between the received signal and the spread code; and means for searching for a peak of a correlation between the received signal and the spread code based on the correlation detection output obtained by the inverse fast Fourier transform means to detect correlation point between the received signal and the spread code;

wherein the fast Fourier transform of the received signal and the fast Fourier transform of the spread code are performed every M periods, where M is a power of two that is two or more, of the spread code, wherein the fast Fourier transform of the received signal is divided into L times, where L is an integer of two or more, so that the same calculation structure components in the fast Fourier transform are set to a unit, and the fast Fourier transform of the received signal is performed every 1/L.

* * * * *

UNITED STATES PATENT AND TRADEMARK OFFICE
CERTIFICATE OF CORRECTION

PATENT NO. : 7,231,095 B2
APPLICATION NO. : 10/362070
DATED : June 12, 2007
INVENTOR(S) : Katsuyuki Tanaka It is certified that error appears in the above-identified patent and that said Letters Patent is hereby corrected as shown below:

On the Title Page, item [54], in the title, "DEMODULATION" should read --DEMODULATING--; and In Column 1, in the title, "DEMODULATION" should read --DEMODULATING--.

Signed and Sealed this

Twenty-seventh Day of May, 2008

JON W. DUDAS
*Director of the United States Patent and Trademark Office*